United States Patent
Tabata et al.

(10) Patent No.: US 7,587,083 B2
(45) Date of Patent: Sep. 8, 2009

(54) IMAGE PROCESSING DEVICE

(75) Inventors: Naohiro Tabata, Kyoto (JP); Hideyuki Kishiba, Kyoto (JP)

(73) Assignee: OMRON Corporation, Kyoto (JP)

( * ) Notice: Subject to any disclaimer, the term of this patent is extended or adjusted under 35 U.S.C. 154(b) by 541 days.

(21) Appl. No.: 10/549,653

(22) PCT Filed: Mar. 19, 2004

(86) PCT No.: PCT/JP2004/003726

§ 371 (c)(1), (2), (4) Date: Jun. 21, 2006

(87) PCT Pub. No.: WO2004/084142

PCT Pub. Date: Sep. 30, 2004

(65) Prior Publication Data

US 2007/0041640 A1 Feb. 22, 2007

(30) Foreign Application Priority Data

Mar. 20, 2003 (JP) .............................. 2003-078467
Dec. 8, 2003 (JP) .............................. 2003-409264

(51) Int. Cl.
*G06K 9/00* (2006.01)
(52) U.S. Cl. ..................................................... 382/162
(58) Field of Classification Search ................ 382/100, 382/103, 115, 117–118, 162, 173, 181, 190; 340/5.52–5.53; 348/77, 78
See application file for complete search history.

(56) References Cited

U.S. PATENT DOCUMENTS

| | | | | |
|---|---|---|---|---|
| 6,466,685 | B1 * | 10/2002 | Fukui et al. | 382/115 |
| 6,546,185 | B1 * | 4/2003 | Kim et al. | 386/46 |
| 6,816,611 | B1 * | 11/2004 | Hagiwara et al. | 382/165 |
| 6,829,384 | B2 * | 12/2004 | Schneiderman et al. | 382/154 |
| 7,269,292 | B2 * | 9/2007 | Steinberg | 382/243 |
| 7,340,079 | B2 * | 3/2008 | Segawa et al. | 382/118 |

FOREIGN PATENT DOCUMENTS

| | | |
|---|---|---|
| JP | 07-113612 | 5/1995 |
| JP | 10-208038 | 8/1998 |
| JP | 10-229505 | 8/1998 |
| JP | 2000-22929 | 1/2000 |
| JP | 2000-105815 | 4/2000 |
| JP | 2000-187722 | 7/2000 |
| JP | 2000-196901 | 7/2000 |

(Continued)

OTHER PUBLICATIONS

Patent Abstracts of Japan, Publication No. 2003-016445, Publication Date: Jan. 17, 2003, 2 pages.

(Continued)

*Primary Examiner*—Jose L Couso
(74) *Attorney, Agent, or Firm*—Osha • Liang LLP

(57) ABSTRACT

An image processing apparatus and a program for causing an information processing system to execute steps involves automatically specifying an area to be subjected to the image correction process such as an area of a human image in an image containing the human image, and an image correction process such as the gradation process is executed only for the specified area.

15 Claims, 14 Drawing Sheets

FOREIGN PATENT DOCUMENTS

| | | |
|---|---|---|
| JP | 2001-307069 | 11/2001 |
| JP | 2002-199179 | 7/2002 |
| JP | 2003-016445 | 1/2003 |
| WO | WO-00/76398 | 12/2000 |

OTHER PUBLICATIONS

Patent Abstracts of Japan, Publication No. 2000-196901, Publication Date: Jul. 14, 2000, 2 pages.
Patent Abstracts of Japan, Publication No. 2000-187722, Publication Date: Jul. 4, 2000, 2 pages.
Patent Abstracts of Japan, Publication No. 10-229505, Publication Date: Aug. 25, 1998, 2 pages.
Patent Abstracts of Japann Publication No. 10-208038, Publication Date: Aug. 7, 1998, 2 pages.
Patent Abstracts of Japan, Publication No. 2001-307069, Publication Date: Nov. 2, 2001, 2 pages.
Patent Abstracts of Japan, Publication No. 2002-199179, Publication Date: Jul. 12, 2002, 2 pages.
Patent Abstracts of Japan, Publication No. 2000-022929, Publication Date Jan. 21, 2000, 2 pages.
Patent Abstracts of Japan, Publication No. 2000-105815, Publication Date Apr. 11, 2000, 2 pages.
Patent Abstracts of Japan, Publication No. 07-113612, Publication Date May 2, 1995, 2 pages.
Supplementary European Search Report for patent application No. 04722000.9-1522, mailed Apr. 15, 2008, 4 pages.
Anonymous: "Adobe Photoshop 5.0 User Guide—Chapter 13: Using Filters", Adobe Photoshop 5.0 User Guide, 1998, pp. 301-308, XP002418843.

\* cited by examiner

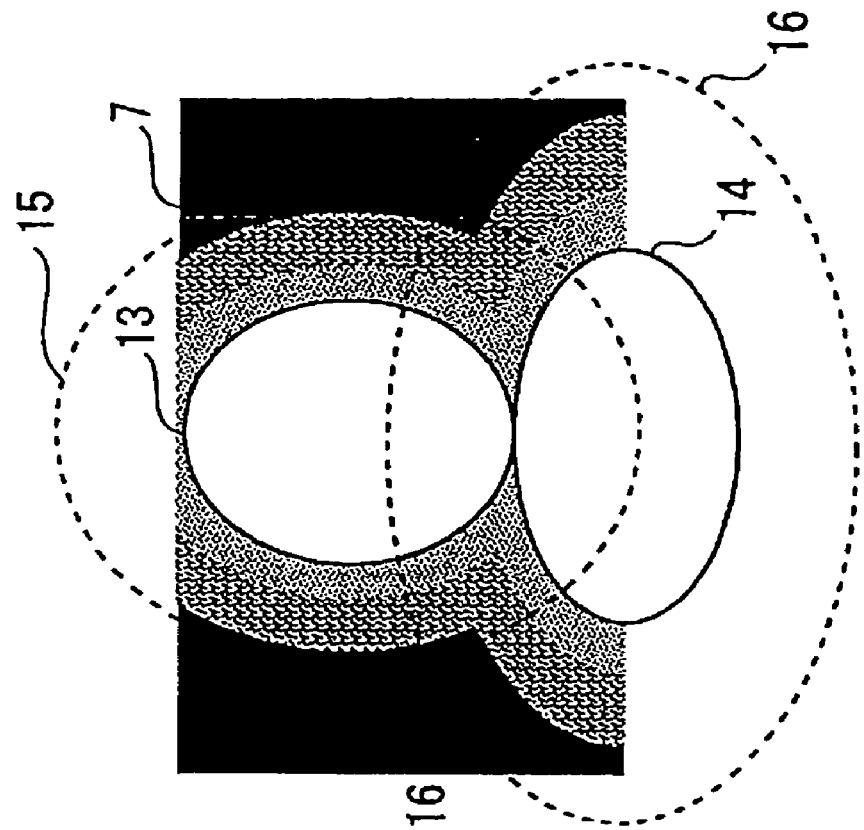
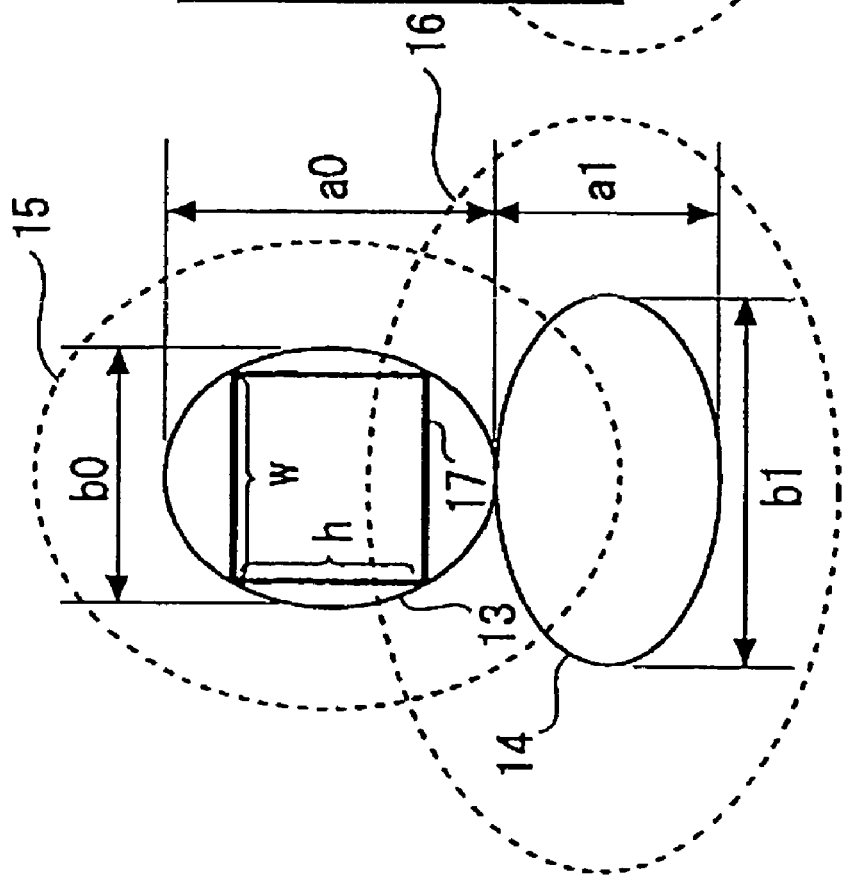
Fig. 3(b)
Fig. 3(a)

| 1 | 0 | 1 |
|---|---|---|
| 2 | 0 | 2 |
| 1 | 0 | 1 |

Fig. 13 (b)

| -1 | 0 | 1 |
|---|---|---|
| -2 | 0 | 2 |
| -1 | 0 | 1 |

Fig. 13 (a)

IMAGE PROCESSING DEVICE

TECHNICAL FIELD

This invention relates to a technique effectively applicable to the processing of an image picked up, or in particular to the processing of an image picked up from a person as an object.

BACKGROUND ART

In the prior art, a technique is available to correct an image of a person as an object by which the skin of the object looks smooth and beautiful. As a specific example of this image correction, a technique for locally shading off the edges or the brightness difference of the whole image or gradating the area of the skin color component of the whole image by using a $\epsilon$-filter (for example, see Patent Document 1).

Also, as a technique intended to correct or remove the undesired components such as wrinkles, spots, rough dry skin or pimples included in a face image, the following technique is available (see Patent Document 2).

First, in respect of a signal value of each pixel forming an image of a face mainly, a signal level difference of each pixel with each surrounding pixel is detected by a difference detector. This signal level difference is compared with a reference value by a threshold determining unit. In accordance with the result of this comparison, an arithmetic unit multiplies the signal level difference by a predetermined coefficient, which is added to each pixel value. From the result of this addition, the reference value for comparison and the coefficient for the multiplier are selected in accordance with the pixel position and the image. In this way, an image free of the undesired components included in the face image is obtained.

As another conventional technique, a human image processing apparatus is available by which a decoration can be added to the body portion of a human image, or especially, the face portion or the head portion without any superposition of decorations (see Patent Document 3). This human image processing apparatus comprises a means for setting the position and the range of a body portion area based on at least one element making up the body portion of a human image, and a means for adding a decoration only to the background area other than the body portion area. Also, this human image processing apparatus may comprise a means for setting the position and the range of the body portion area based on at least one element making up the body portion of a human image and a means for adding a decoration along the outer periphery of the body portion area.

[Patent Document 1]
U.S. Pat. No. 3,319,727
[Patent Document 2]
Japanese Unexamined Patent Publication No. 2000-105815
[Patent Document 3]
Japanese Unexamined Patent Publication No. 2000-022929

DISCLOSURE OF THE INVENTION

In the conventional technique, the gradation process is executed for the skin of an object aimed at the portion having a color component near to the skin color existing in the image. As a result, even the portion having a color component different from the skin color is prevented from being gradated and blurred.

In the conventional technique, however, any portion of an object or the background having a color component near the skin color which may exist in the image is also gradated. This poses the problem that even the background other than a person constituting an object, which has a color component near to the skin color, is blurred.

Also, in the conventional technique, the skin color component to be gradated is held fixedly. The prior art, therefore, often fails to handle the difference in skin color between different races or individuals. In such a case, the gradation process for the skin area cannot always be correctly executed.

This problem of the gradation process is posed also in other image processing as well as the gradation process.

The object of this invention is to solve this problem and prevent the area not to be subjected to the image processing such as the gradation process from being subjected to the image processing.

For example, the image processing (such as the gradation process) is carried out only for a specified area (the face skin portion, for example) of a person constituting an object for the purpose of preventing the background having a color component near to the skin color from assuming an unnatural state (blurred, for example) by the image processing.

Another object of the invention is to carry out the image processing in accordance with the difference in skin color between different races or individuals by specifying the color component for determining the area to be subjected to the image processing (gradation processing, for example) such as the skin color component from the image.

In order to solve the aforementioned problem, this invention has the following configuration. According to a first aspect of the invention, there is provided an image processing apparatus comprising a target area specifying means and an image generating means.

The target area specifying means specifies a target area determined based on the body portion of a person providing an object in the image. The target area specifying means may be configured so that the user specifies a target area manually. Specifically, the target area specifying means may be so configured that the body portion is specified based on the area in the image designated by the user, and with the specified body portion as a reference, the target area is further specified. For example, the target area specifying means may be so configured that the area designated by the user is specified as a body portion, or the body portion may be specified based on a spot, area, color or the shape designated by the user. The target area specifying means may be configured to specify a target area based on the body portion specified in this way.

Also, the target area specifying means may be configured to specify a target area independently of the input operation of the user. The target area specifying means, for example, may be configured to include a detection means for detecting the body portion of a person providing an object in the image and a specifying means for specifying a target area based on the body portion detected by the detection means.

Specifically, the detection means detects the position and the range (size) of the body portion of an object. The "body portion" indicates a part or the whole of the body of a person including the head, the face, the hands and the torso. The detection means may be configured using any existing means.

The image generating means generates an image by executing the image processing on a target area specified by the target area specifying means. The term "image processing" used herein is a process for manipulating the image. An example of image processing is such a process as image correction or texture mapping.

Also, the term "image correction" used herein is a process for manipulating the image without changing the property of the object of an image. An example of image correction includes the gradation process, edge contrast, brightness correction or color correction. In this case, the gradation process is a process for blurring the image portion of wrinkles or spots of the skin so that the skin of the person providing an object appears smooth. The gradation process is a process executed by using the technique called the smoothing, for example, and carried out by removing the high frequency component of the skin image. An example includes the moving average filter, the load average filter (including the Gaussian filter) or the ε-filter.

According to the first aspect of the invention, an image can be acquired which is not subjected to the image processing for other than the target area specified by the target area specifying means. Specifically, an image can be acquired in which the image processing is carried out only in a target area based on the body portion of a person making up an object. Therefore, the portion (background, for example) different from the object to be subjected to the image processing is prevented from becoming an unnatural state by the image processing. In other words, the image processing is prevented from being carried out for the portion not intended for by the user.

In the case where the image processing carried out on the image is the gradation process, for example, an image can be acquired in which the portion other than the target area specified by the target area specifying means is not gradated. In other words, an image gradated only in a target area of a person providing an object can be acquired. Thus, the portion (background, for example) other than an object can be prevented from being blurred by the gradation process.

The image generating means may be configured in such a manner as to generate an image subjected to the image processing based on the color component of the skin color of a person providing an object, as extracted from the body portion providing a reference of the target area specified by the target area specifying means.

The above-mentioned configuration of the image generating means makes it possible to carry out the image processing corresponding to the skin color of each person providing an object. Thus, an image can be acquired in which the image processing is carried out accurately for each object of a different skin color in accordance with the difference in skin color between different races or different individuals.

As a configuration having a similar effect, the image generating means may be configured to generate an image subjected to the imaging processing on that area within a target area specified by a target area specifying means which has a color component equal or similar to the main color component of the body portion providing a reference of the target area.

According to a second aspect of the invention, the image generating means of the first aspect is configured to have a strength value calculation means, a mask means, an image processing means and a color component calculation means.

The strength value calculation means calculates the strength value indicating the degree to which the color component of each pixel is near to a predetermined skin color component for each pixel of the image to be processed. The color component can assume a value based on any color space, and an example includes the Lab value, the RGB value or the xy value. The skin color component is a predetermined value, and stored, for example, in the RAM (random access memory) of the image correction unit. The strength value is expressed, for example, by the values of 256 grades of 0 to 255. The strength value of 0 indicates, for example, a color component farthest from the skin color component, and the strength value of 255 indicates a color component nearest (the very skin color component) to the skin color component.

In the mask means, the strength value for the pixels in other than a target area specified by a target area specifying means is changed to a value far from the skin color component.

For example, 0 can be employed as a value indicating the farthest color component and 255 as a value indicating the nearest color component from the skin color component. The mask means may generate a mask image to conduct the mask process on an area other than the target area and multiply the generated mask image by the image indicating the strength value of each pixel thereby to set the strength value as described above. In the illustrated case, the strength value of the area other than the target area is 0 and the strength value in the target area is not less than 0.

The image processing means conducts the image processing on an image to be processed. The image processing conducted by the image processing means is defined the same way as the image processing defined in the explanation of the image generating means.

The color component calculation means calculates a color component which is nearer to the color component of the pixel of the original image as a new color component of each pixel, the farther the strength value of the particular pixel from the skin color component on the one hand, and calculates a color component which is nearer to the color component of a pixel of the image generated by the image processing means as a new color component of the pixel, the nearer the strength value of the particular pixel to the skin color component on the other hand. The color component calculation means calculates a new color component of each pixel (i.e. the color component of each pixel of an image output) based on the strength value calculated by the strength value calculation means and the mask means.

The color component calculation means is configured, for example, in such a manner that in the case where the image processing is the gradation process, the larger the strength value, the stronger the color component of the gradated image (the image obtained by gradating the original image) is reflected in the image generated. Also, the color component calculation means is configured in such a manner that the smaller the strength value, the stronger the color component of the original image is reflected in the image generated. By this configuration, the effect of the image processing is prevented to extend to an area other than the skin color. In the case where this effect is desired most conspicuously, the strength value for the pixels in other than a target area is set to a value farthest from the skin color component.

According to a third aspect of the invention, the image generating means according to the first aspect of the invention is configured of a strength value calculation means, a mask means and an image processing means. According to the third aspect of the invention, the image generating means includes no color component calculation means, and the color component of an image output is calculated by the image processing means. The strength value calculation means and the mask means according to the third aspect are identical with the strength value calculation means and the mask means, respectively, of the second aspect. The image processing means according to the third aspect, on the other hand, conducts the image processing on each pixel of an image to be processed in such a manner that the farther the strength value of the pixel from the skin color component, the more the effect of the image processing is weakened on the one hand, and the nearer the strength value of each pixel from the skin color component, the more the effect of the image processing is strengthened on the other hand. This image processing means carries out the image processing based on the strength value of each pixel of the image obtained by the strength value calculation means and the mask means. In this way, according to the third aspect of the invention, the color component calculation means is not required. As a result, the apparatus can be reduced in size, increased in the processing speed and reduced in cost.

According to a fourth aspect of the invention, the image generating means includes a strength value calculation means, an image processing means and a color component calculation means. In the fourth aspect, the definition of the strength value calculated by the strength value calculation means is different from that in the second aspect. According to the fourth aspect, the strength value indicates the degree to which the color component of each pixel is near to the main color component representing the body portion providing a reference of a target area. The strength value calculation means according to the fourth aspect, therefore, calculates the strength value indicating the degree to which the color component of each pixel of the image to be processed is near to the main color component representing the body portion constituting a reference of the target area.

Also, the fourth aspect is different from the second aspect in that the mask means may or may not be provided. In the absence of the mask means, the color component calculation means naturally calculates a new color component of each pixel without using the strength value of a mask image. Further, in the absence of the mask means, the image processing means is configured to conduct the image processing on a target area of the image to be processed.

Except for the aforementioned three points, the fourth and second aspects have a similar configuration. According to the fourth aspect, unlike in the second aspect, the strength value is varied with the processing result of the target area specifying means. Specifically, the image processing is conducted in accordance with the skin color of the body portion of each person providing an object. In accordance with the difference in the skin color due the race or individual differences, therefore, the image processing can be carried out accurately for objects of different skin colors.

According to a fifth aspect of the invention, the image generating means is configured of a strength value calculation means and an image processing means. Also, according to the fifth aspect of the invention, like in the third aspect of the invention, the color component calculation means is not required, and the color component of the image output is calculated by the image processing means. According to the fifth aspect of the invention, therefore, like in the third aspect of the invention, the apparatus can be reduced in size and increased in the processing speed while at the same time reducing the cost. In the fifth aspect of the invention, like in the fourth aspect of the invention, however, the strength value is not determined based on a predetermined skin color component, but based on the main color component representing the body portion providing a reference of the target area. According to the fifth aspect of the invention, therefore, the image processing can be carried out accurately for each object of a different skin color in accordance with the skin color difference between races or individuals. Also, in the fifth aspect of the invention, like in the fourth aspect, the mask means may or may not be included.

In the second to fifth aspects of the invention, the image processing means may be configured not to conduct the image processing on the pixels having a strength value in a predetermined range. The "strength value in a predetermined range" is defined as a strength value indicating an area not desirably constituting an object of the image processing. A specific example is a strength value farthest from the skin color component or the main color component representing the body portion providing a reference of a target area. The color component calculation means according to the second or fourth aspect or the image processing means according to the third or fifth aspect may be set to generate an output image in such a manner that the image processing has no effect on the pixels having a predetermined range of strength value. In such a setting, it is not necessary to take the trouble of conducting the image processing on the pixels having the predetermined range of the strength value. By omitting the image processing on these pixels, therefore, the time required for the image processing by the image processing means can be saved. Especially, in the second and fourth aspects having no such configuration, the image processing means conducts the image processing regardless of the strength value of each pixel. Then, the process corresponding to the strength value is executed by the color component calculation means, with the result that the image processing conducted by the image processing means may not be reflected in some pixels at all. The configuration in which the image processing means determines whether the image processing is to be conducted or not in accordance with the strength value, therefore, is effective especially in the second and fourth aspects.

According to a sixth aspect of the invention, the image generating means determines the contents of the image processing to be conducted, based on the size of the body portion providing a reference of a target area specified by the predetermine area specifying means. The image generating means generates, for example, the parameters for carrying out a predetermined image processing, based on the size of the body portion providing a reference of a target area. Examples of the parameters include the degree of gradation (more specifically, the size of the radius of the Gaussian filter in the case where the gradation process is executed using the Gaussian filter) of the gradation process, the degree of edge contrast and the degree of brightness correction. Examples of determining the type of image processing includes the determination as to whether or not the edge contrast is taken or not, whether the brightness correction is carried out or not, and whether the gradation process is carried out or not.

The gradation process is explained as an example. In the case where the gradation process is executed excessively for a small area, the whole area would be blurred and the desired image (the image corrected to secure an appropriately smooth skin, for example) could not be obtained. In the case where an excessively small gradation process is executed for a large area, on the other hand, the points to be gradated (for example, the undesirable portions included in the face image such as wrinkles, spots, rough dry skin, pimples, etc.) could not be sufficiently blurred and the desired image could not be obtained. This is also the case with other image processing such as the degree of edge contrast. In view of this problem, according to the sixth aspect of the invention, the proper contents of the image processing are determined and carried out in accordance with the size of the body portion providing a reference of the target area to obtain the image desired by the user.

Also, the image generating means may be configured to determine the contents of the image processing to be conducted, based on the size of the body portion detected by a detection means.

A seventh aspect of the invention further comprises an element extraction means. The element extraction means extracts at least an element making up the body portion of a person providing an object in an image to be processed, which element is included in a target area. The "element" indicates a part making up the body portion. Examples of the element include parts of the face (specifically, eyes, eyelids, lips, nose, nostrils, eyebrows, eyelashes, etc.). In this case, the face constitutes a body portion and the face parts the elements. The element extraction means may employ any existing techniques.

In the seventh aspect of the invention, the image generating means conducts the image processing, in limited way, on an element area determined based on the element extracted by the element extraction means. Specifically, the image generating means may be configured not to conduct the image processing in the target area described above. Alternatively, the image generating means may be configured to conduct the image processing on the target area with different parameters (by suppressing the degree of image processing) as compared with the other areas where the image processing is conducted.

According to the seventh aspect of the invention, the image generating means carries out the limited image processing on an element area determined based on the element extracted by the element extraction means. As a result, the effect of the image processing on the element area is suppressed. According to other aspects of the invention, the contents of the image processing are determined based on the body portion providing a reference of the target area and the color component. In this case, with regard to the pixels having a color component near to the skin color component in a target area or the main color component representing the body portion providing a reference of the target area, the elements corresponding to the elements described above are subjected to the image processing unconditionally. Actually, however, the desire exists to limit (suppress) the effect of the image processing on these elements. Depending on the method of makeup, for example, the color of the lips (color of the lipstick) or the elements such as the eyelashes may be configured of a color component near to the skin color component. In such a case, it may not be desired to conduct the same image processing (such as gradation) on the elements as on the other skin portion. The seventh aspect of the invention effectively applies in such a case. Specifically, the image processing on the elements not sufficiently distinguishable by the strength value calculation means or the mask means can be accurately suppressed.

In the second to fifth aspects of the invention, the image generating means may be configured to further include an edge mask means. The edge mask means acquires the edge strength of each pixel of the image to be processed, and produces a strength value indicating the fact that the higher the edge strength extracted, the farther the skin color component or the main color component representing the body portion providing a reference of the target area. By acquiring the strength value based on the edge strength, the edge of the element making up the body portion of an object can be acquired as a pixel having a strength value indicating that the color component is far. The edge mask means may be configured to produce the same edge strength for the pixels located within a predetermined range from a given pixel as for the particular given pixel.

In the second to fifth aspects of the invention having the above-mentioned configuration, the color component calculation means and the image processing means are configured to further acquire a new color component for each pixel based on the strength value acquired by the edge mask means. With the second to fifth aspects of the invention having this configuration, a similar effect to the seventh aspect can be produced.

Also, in the second to fifth aspects of the invention having this configuration, the edge mask means may be configured to enlarge, after reducing, the image to be processed to the original size by applying a strength value to each pixel.

The edge extracted by the edge mask means is subjected to the limited image processing described above. Take the process of gradating the skin component not required as an example. If the unrequired skin component is detected as an edge by the edge mask means, the gradation process for this unrequired skin component would fail to work effectively. It is necessary, therefore, to control the edge mask means not to extract the edge of the unrequired component.

An image being reduced loses the minuscule edge information of the original image. In the case where the edge strength is acquired for a reduced image, therefore, the minuscule edge of the original image cannot be acquired. The unrequired skin component to be gradated is often configured of a minuscule edge. Taking advantage of this feature, the aforementioned configuration is employed, so that the edge acquisition for the unrequired skin component by the edge mask means can be prevented. Specifically, the above-mentioned configuration of the edge mask means makes possible the desired gradation process. A similar effect can be produced also by executing the edge extraction after the smoothing process using a median filter or by setting a large radius of the filter used for the edge extraction process. Since the edge is extracted in the reduced image, on the other hand, the time required for edge extraction can be reduced.

According to an eighth aspect of the invention, there is provided an image processing apparatus comprising an image specifying means and an image processing means. The image specifying means specifies the position and the range of an area including an arbitrary image in the image. The arbitrary image is defined as an image to be processed by the image processing means, and may assume any form. For example, it is a part or the whole of the human body such as the face or the hands or such an object as a food or an automobile or the background such as the sky or a mountain.

The image specifying means may be configured using any existing technique. The image specifying means can be configured, for example, to carry out the pattern matching using a pattern having a similar shape to an arbitrary image involved.

The image processing means generates an image subjected to the image processing in an area which is located in an area specified by the image specifying means and which has a color component equal or similar to the main color component representing the particular specified area. An example of the image processing executed by the image processing means is the one using a low-pass filter or a high-pass filter. There are also other various processes such as the image processing defined in the first aspect, the color inversion process and the image rotation process.

According to the eighth aspect of the invention, even in an area within the specified area, the execution of the image processing can be prevented for the portions different from the main portion. In the case where it is desired to change the color of only the vehicle body (main portion), for example, the color change of the window glass and the bumper (portions different from the main portion) can be prevented.

The first to eighth aspects of the invention may be implemented also by executing a program on an information processing system. Specifically, according to this invention, the process executed by each means in the first to eighth aspects described above can be specified as a program to be executed by the information processing system or a recording medium for recording the particular program.

According to this invention, the image correction can be carried out only in a specified limited area of a person making up an object. Therefore, the portions (such as the background) different from the object are prevented from assuming an unnatural state as the result of image correction. Also, the image processing can be carried out in accordance with the skin color difference from one race or individual to another.

BRIEF DESCRIPTION OF THE DRAWINGS

FIG. 3 is a diagram showing an outline of the mask process;

FIG. 8 is a diagram showing an example of the n×n operator;

FIG. 13 is a diagram showing an example of the Sobel filter; and

BEST MODE FOR CARRYING OUT THE INVENTION

First Embodiment

Next, the image correction unit according to an embodiment of the invention is explained with reference to the drawings. The description that follows deals with an image correction unit 1a as a specific example of the image correction unit according to a first embodiment to correct the image of the skin area in a human image. Specifically, the gradation process is explained as an example of the image processing to be carried out. The image correction unit 1a may be used also for the image other than the human image such as a vehicle or a landscape. In this case, various image processing are conceivable including the image correction for changing the color or the image correction using a high-pass filter.

In this description, the human image is an image including at least a part or the whole of the human face. The human image, therefore, may include the image of the person as a whole or the image of only the face or the upper half portion of the person. Also, an image of a plurality of persons may be included. Further, any pattern of a landscape (background: including an object watched as an object) or a figure other than a person may be included in the background.

The explanation of this embodiment is illustrative and the configuration of the invention is not limited to the following description.

[System Configuration]

The image correction unit 1a, in terms of hardware, is configured of a CPU (central processing unit), a main storage (RAM) and an auxiliary storage unit connected through a bus. The auxiliary storage unit is configured of a nonvolatile storage unit. The term "nonvolatile storage unit" as used herein designates what is called the ROM (read-only memory) (including the EPROM (erasable programmable read-only memory), EEPROM (electrically erasable programmable read-only memory and the mask ROM), FRAM (ferroelectric RAM) and the hard disk.

Figure 1:
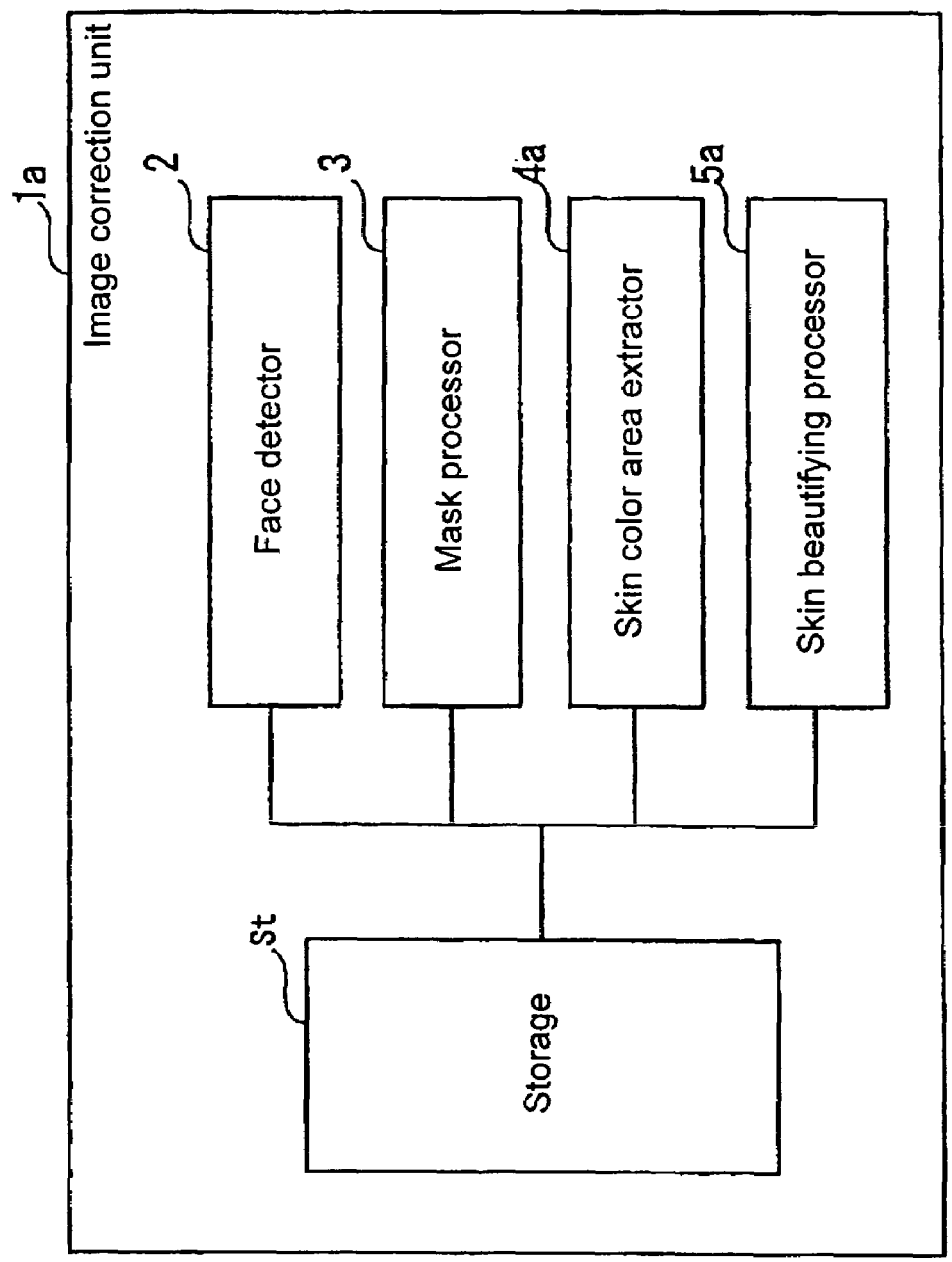
FIG. 1 is a diagram showing the function blocks of an image correction unit according to a first embodiment.

FIG. 1 is a diagram showing the function blocks of the image correction unit 1a. The image correction unit 1a, in which the various programs (OS, applications, etc.) stored in the auxiliary storage unit are loaded in the main storage unit and executed by the CPU, functions as a device including a face detector 2, a mask processor 3, a skin color area extractor 4a, a skin beautifying processor 5a and a storage St. The face detector 2, the mask processor 3, the skin color area extractor 4a and the skin beautifying processor 5a are implemented by the CPU executing the image correction program according to the invention.

The storage St is configured of what is called the RAM. The storage St is used for the various processes executed by the face detector 2, the mask processor 3, the skin color area extractor 4a and the skin beautifying processor 5a. The data read from or written into the storage St, for example, include the data of an original image 6 to be processed, a mask image 7 as an intermediate data, a skin color strength image 8, a masked skin color strength image 9, a skin color area image 10a and a gradation image 11 or the data of the skin beautification image 12 as an output data.

Figure 2:
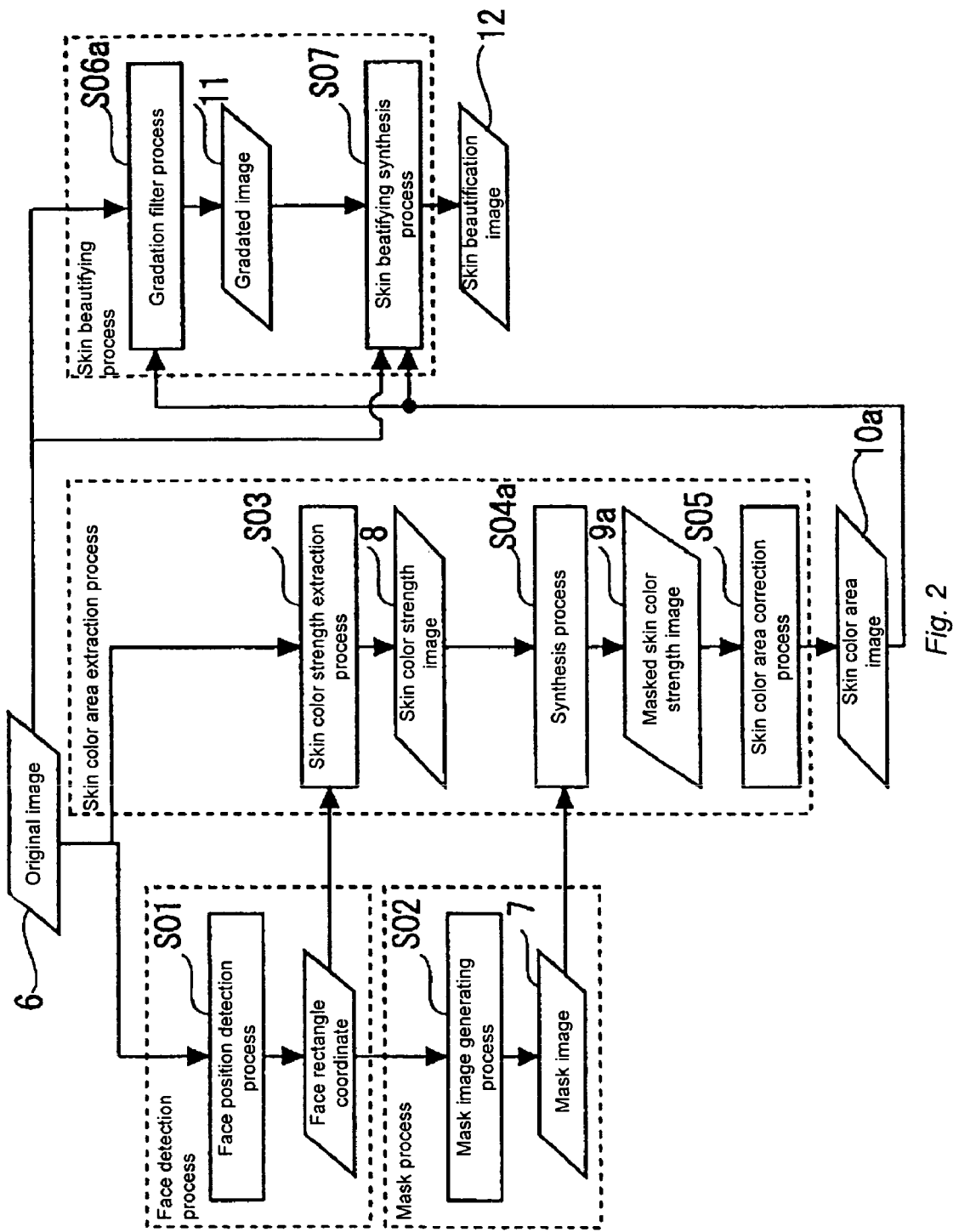
FIG. 2 is a diagram showing the processing flow of the image correction unit according to the first embodiment.

FIG. 2 is a diagram showing the process executed by each functional unit shown in FIG. 1 and the overall processing flow of the image correction unit 1a. With reference to FIG. 13, each functional unit is explained below.

<Face Detector>

The face detector 2 executes the face detection process. The face detection process is explained below. In the face detection process, the data of the original image 6 is input and the face position detection step S01 is executed thereby to output a face rectangle coordinate. Specifically, in the face detection process, a face is detected as a body portion of an object. From this face rectangle coordinate, the position of the face of the person constituting an object in the original image 6 is specified.

The data of the original image 6 is the data of the human image input to the image correction unit 1a. The face rectangle is recognized as a rectangle including the face portion of a person contained in the original image 6 (hereinafter referred to as the face rectangle. See reference numeral 17 of FIG. 3(a)). The face rectangle coordinate is the data indicating the position and size of the face rectangle in the original image 6.

The face position detection step S01 may be implemented by any existing method (for example, see Patent Document 3). The face rectangle coordinate can be obtained, for example, by template matching using a reference template corresponding to the contour of the whole face. Also, the face rectangle coordinate can be obtained by template matching based on the face component elements (eyes, nose, ears, etc.). Further, the top of the hair may be detected by the chroma key process, and based on this top, the face rectangle coordinate can be obtained. Also, at the face position detection step S01, the face rectangle or the face rectangle coordinate may be specified manually by the user. In similar fashion, the face rectangle or the face rectangle coordinate can be specified based on the information input by the user, i.e. semiautomatically.

<Mask Processor>

The mask processor 3 executes the mask process. The mask process is explained below. In the mask process, the face rectangle coordinate is input and the mask image generation step S02 is executed thereby to output the data of the mask image 7.

In the mask image generation step S02, the face and the area under the face of a person constituting an object are estimated based on the position of the face of the person constituting the object, i.e. the face rectangle coordinate input in this apparatus 1 thereby to generate a mask image to mask other than the estimated area. In other words, at the mask image generation step S02, a target area (the face and the area under the face in the case under consideration) is specified based on the position of the face as a body portion, and the mask image 7 is generated to mask other areas. In this way, according to this embodiment, the face detector 2 and the mask processor 3 are used as an example of a target area specifying means. Also, according to this embodiment, the mask processor 3 is used as an example of the specifying means and the mask means.

FIG. 3 is a diagram showing an outline of the mask image generation step S02. In the mask image generation step S02, first, the coordinates of two ellipses 13, 14 corresponding to the input face rectangle coordinate are calculated using the equation of Expression 1 shown below. Specifically, first, the width (w) and the height (h) of the face rectangle are calculated or input. By multiplying the preset elliptic ordinate coefficient (p0, p1) and the elliptic abscissa coefficient (q0, q1) by w and h, respectively, the length of the long and short axes of the two ellipses (a0, b0, a1, b1) can be obtained.

The ellipse 13 is a figure indicating the area of the human face providing an object and the ellipse 14 a figure indicating the area of the parts (neck, chest, shoulder, etc.) under the face of the person providing the object. According to this invention, the ellipse 13 is set in contact with four points of the face rectangle 17. On the other hand, the ellipse 14 is set to circumscribe on the lowest portion of the ellipse 13 with the long axis thereof kept horizontal.

$a0 = h \times p0$ $b0 = w \times q0$ $a1 = h \times p1$ $b1 = w \times q1$ [Expression 1]

Next, at the mask image generation step S01, the two ellipses 13, 14 obtained are enlarged to obtain ellipses 15, 16, respectively. The ellipses 13, 15 have the same center (the intersection of the long and short axes) and so do the ellipses 14, 16. Using the ellipses 13 to 16 thus obtained, the mask image 7 is acquired.

For example, the inside of the ellipse 13 and the inside of the ellipse 14 are set as a transmission area (the area not masked). Next, in the area between the ellipses 15, 13 and the area between the ellipses 16, 14, the transmittance gradation is created with the transmission ratio increasing from outside (ellipses 15, 16 side) toward inside (the ellipses 13, 14 side). This gradation may be either linear or nonlinear. The area constituting the outside of the ellipse 15 and the outside of the ellipse 16 is set as a non-transmission area (masked area).

By this mask image generation step S02, the data of the mask image 7 is output. The mask image 7 may be generated using any figure other than the ellipse. For example, it may be generated using a special figure in the shape of the upper half portion of the person.

<Skin Color Area Extractor>

The skin color area extractor 4a executes the process of extracting the skin color area. The skin color area extraction process is explained below. In the skin color area extraction process, the data of the original image 6, the face rectangle coordinate and the data of the mask image 7 are input, while the skin color strength extraction step S03, the synthesis step S04a and the skin color area correction step S05 are executed thereby to output of the data of the skin color area image 10a. In this way, according to this embodiment, the skin color area extractor 4a is used as an example of the strength value calculation means.

<<Skin Color Strength Extraction Process>>

Figure 4:
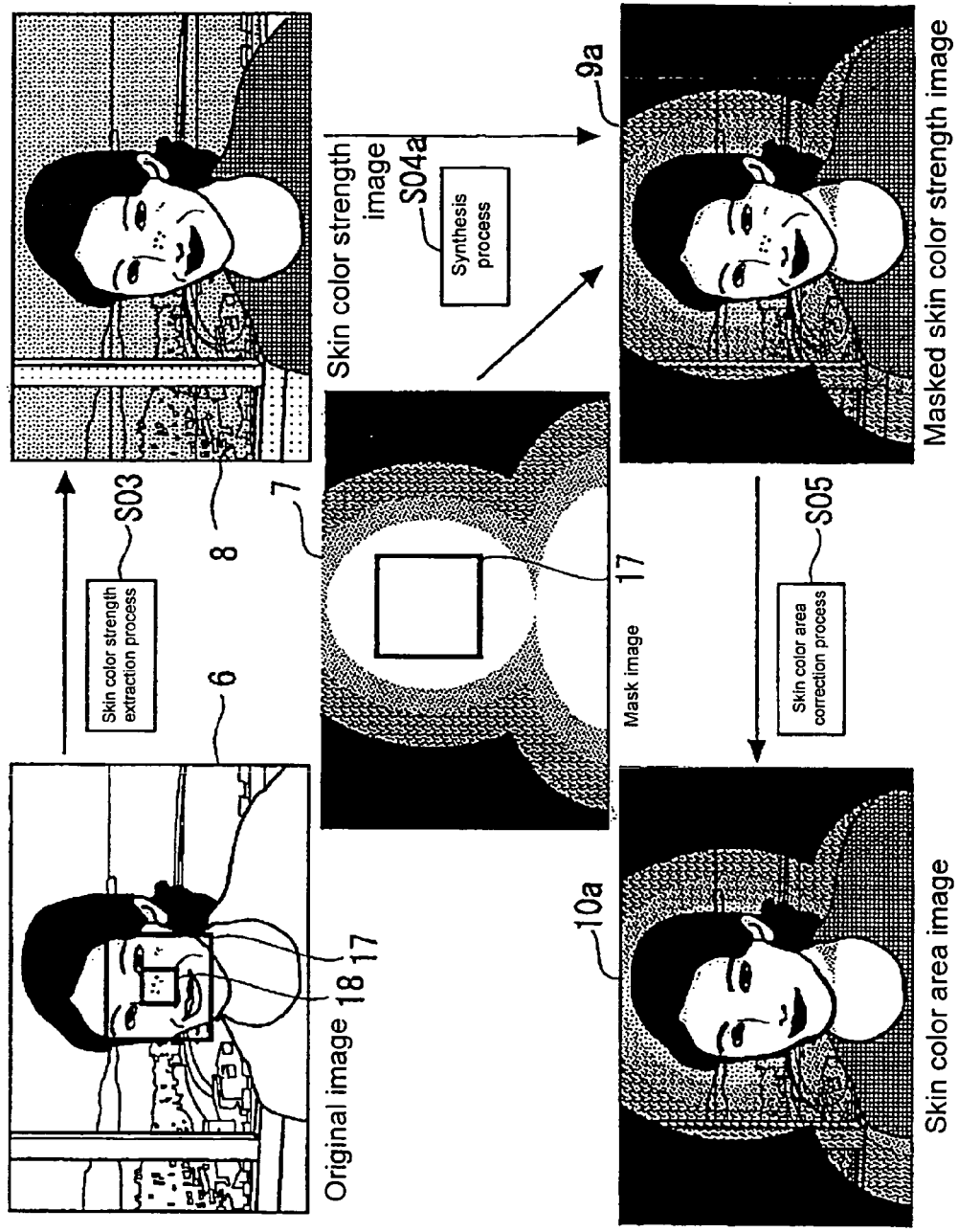
FIG. 4 is a diagram showing an outline of the skin color area extraction process according to the first embodiment.

FIG. 4 is a diagram showing an outline of the skin color area extraction process. In the skin color area extraction process, first, the data of the original image 6 and the face rectangle coordinate are input and the skin color strength extraction step S03 is executed.

Figure 5:
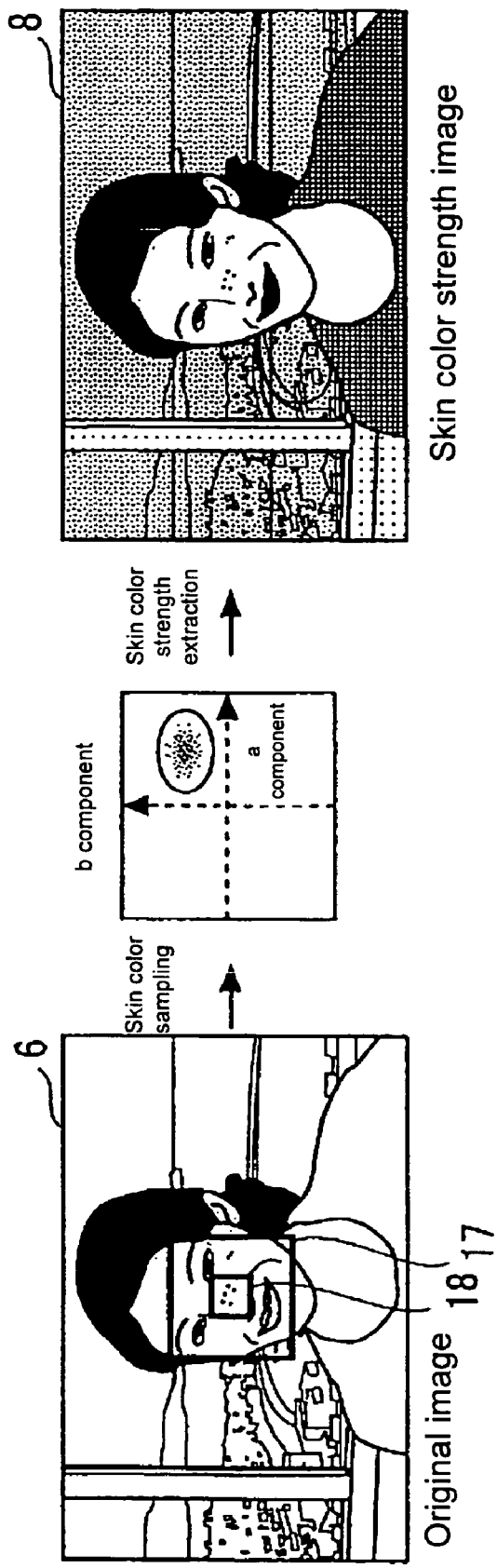
FIG. 5 is a diagram showing an outline of the skin color strength extraction process.
Figure 6:
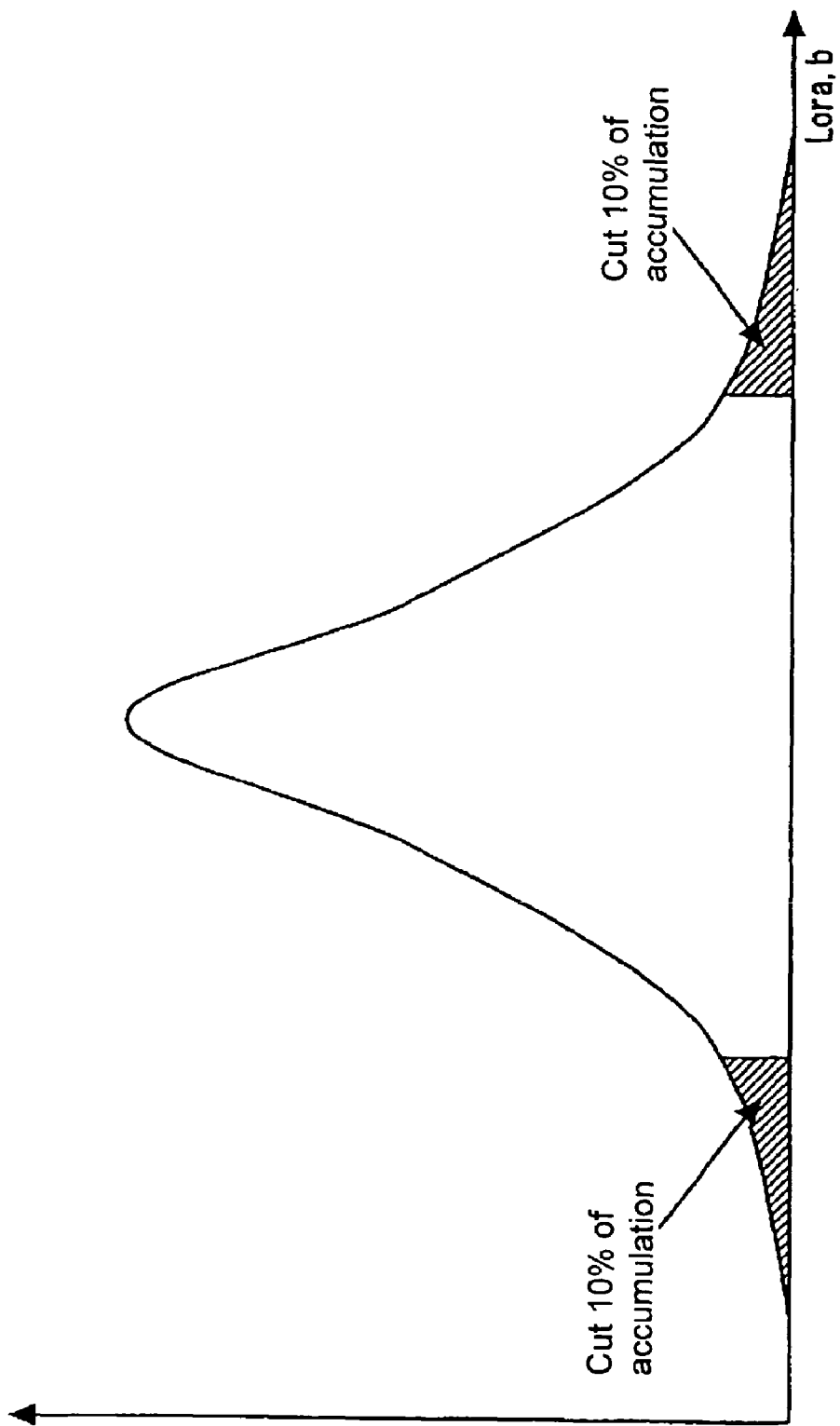
FIG. 6 is a diagram showing an example of the histogram of the skin color component.
Figure 7:
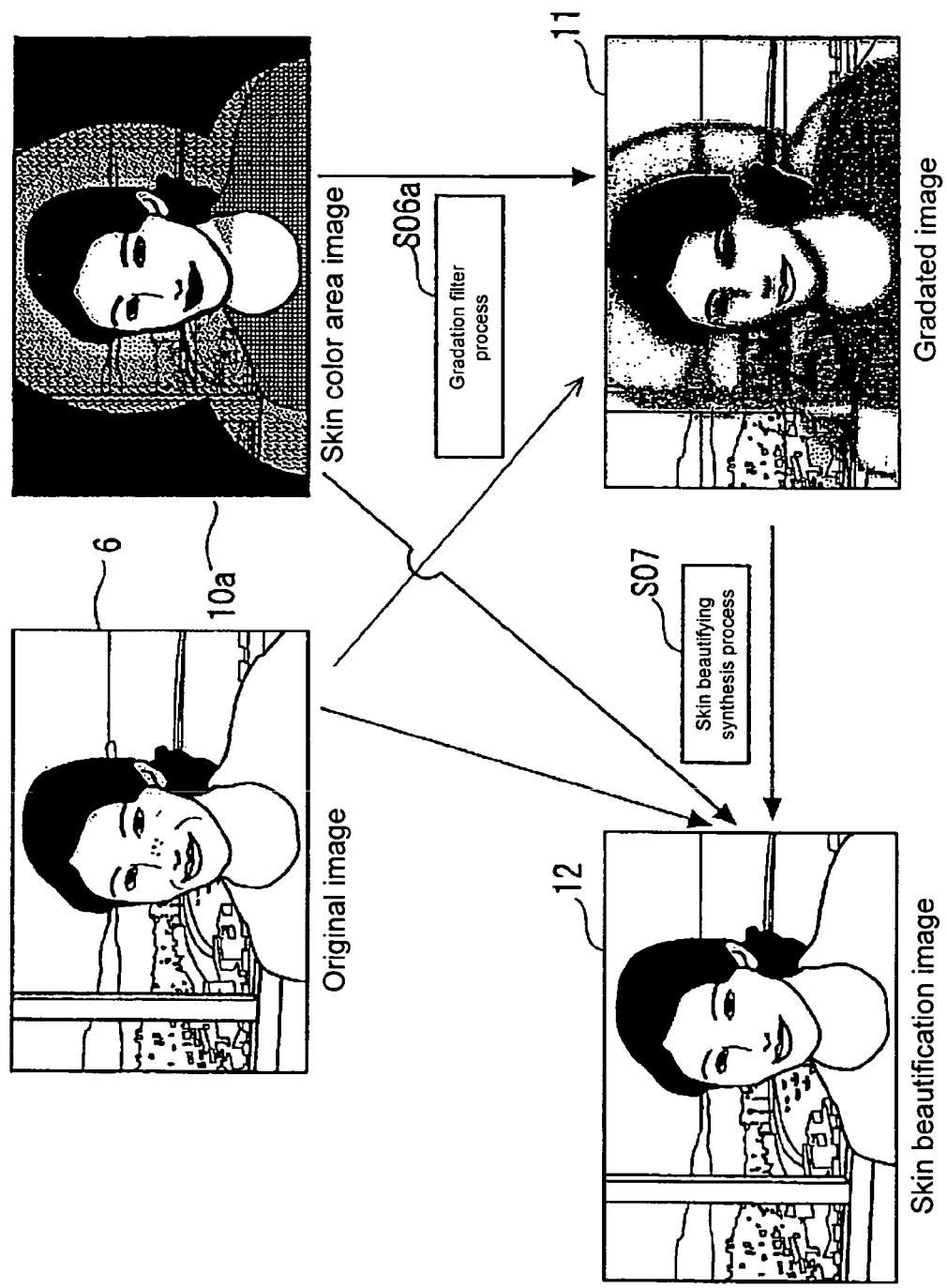
FIG. 7 is a diagram showing an outline of the skin beautifying process according to the first embodiment.

FIG. 5 is a diagram showing an outline of the skin color strength extraction step S03. FIG. 6 is a diagram showing a histogram of the skin color component used in the skin color strength extraction step S03. The skin color strength extraction step S03 is explained below with reference to FIGS. 5, 6.

At the skin color strength extraction step S03, first, the sampling area 18 is specified inside the face rectangle 17 using the input face rectangle coordinate. The sampling area 18 is specified by, for example, the center coordinate of the face rectangle 17 and the values w and h of the face rectangle 17 multiplied by a constant. The sampling area 18 may alternatively be specified by other methods. The sampling area 18 is desirably set in such a manner as not to include areas such as the eyes or nostrils apparently having a different color from the skin.

Next, at the skin color strength extraction step S03, the pixel value (color component value) in the sampling area 18 is sampled (skin color sampling). In this sampling process, the skin color of the face of the object is mainly sampled. Based on the value of the sampled color component, the histogram shown in FIG. 6 is formed. FIG. 6 shows an example of the histogram formed based on the Lab color space. Once the histogram is formed, the components 10% (hatched in FIG. 6) above and below the abscissa (value of L or a, b) is cut off. The numerical value of 10% referred to herein can be appropriately changed by the designer. After that, using the Lab value for the portion not cut in the skin color component histogram, the standard deviation and the center of gravity in the sampling area 18 are calculated. In accordance with the equation of Expression 2 using the six values thus calculated, the degree of the skin color (hereinafter referred to as the skin color strength, which corresponds to the strength value) of each pixel of the original image 6 is calculated (the skin color strength extracted) thereby to generate the skin color strength image 8.

$$\text{Skin color strength} = \exp\left\{-\left[\left(\frac{L'-L}{W_L}\right)^2 + \left(\frac{a'-a}{W_a}\right)^2 + \left(\frac{b'-b}{W_b}\right)^2\right]\right\}$$ [Expression 2]

where L', a', b' are the center of gravity of the Lab value in the sampling area, and $W_L$, $W_a$, $W_b$ the standard deviation of the Lab value of the sampling area multiplied by a constant.

In forming the skin color component histogram, the accumulated portion representing 10% from the ends of the abscissa in FIG. 6 are cut off and therefore the noise component is removed so that the distribution of the skin color component can be acquired more accurately. The term "noise component" referred to herein indicates the information on the pixels mainly having the color component other than the skin color such as the nostrils and eyes in the sampling area 18. This process makes it possible to delete the information on the color components other than the skin color such as the nostrils and eyes, if included in the sampling area 18.

<<Synthesis Process>>

Next, in the skin color area extraction process, the data of the skin color strength image 8 and the data of the mask image 7 are input and the synthesis step S04a is executed.

At the synthesis step S04a, the input skin color strength image 8 and the mask image 7 are synthesized with each other. Specifically, the skin color strength image 8 generated by the skin color strength extraction step S03 and the mask image 7 generated by the mask process are multiplied by each other. The execution of the synthesis step S04a generates the masked skin color strength image 9.

<<Skin Color Area Correction Process>>

Next, in the skin color area extraction process, the data of the masked color strength image 9 is input and the skin color area correction step S05 is executed.

At the skin color correction step S05, the reduction process is executed on the masked skin color strength image 9 generated at the synthesis step S04a. The execution of the reduction step reduces the skin color strength around the eyes and mouth. Specifically, the black area (area of low or zero skin color strength) not to be gradated is expanded outward. This reduction step prevents the gradation process from being executed for the parts surrounding the eyes and mouth. In other words, the parts around the eyes and the mouth of which a clear image is to be acquired are prevented from being blurred. The execution of the skin color area correction step S05 generates the skin color area image 10a. In the skin color area image 10a, the pixels having a high skin color strength are expressed with a large pixel value, and vice versa.

<Skin Beautifying Processor>

The skin beautifying processor 5a executes the skin beautifying process. The skin beautifying process executed by the skin beautifying processor 5a is explained below. In this skin beautifying process, the data of the original image 6 and the data of the skin color area image 10a are input, and the gradation filter step S06a and the skin beautifying synthesis step S07 are executed thereby to output the data of the skin beautification image 12. In this way, according to this embodiment, the mask processor 3, the skin color area extractor 4a and the skin beautifying processor 5a are used as an example of the image generating means. Also, according to this embodiment, the skin beautifying processor 5a is used as an example of the color component calculation means. This data of the skin beautification image 12 is output by the image correction unit 1a.

<<Gradation Filter Process>>

First in the skin beautifying process, the data of the original image 6 and the data of the skin color area image 10a are input and the gradation filter step S06a executed. At the gradation filter step S06a, the original image 6 is gradated. The term "gradation" used herein may be any existing gradation process. A method using the moving average filter, the load average filter (including the Gaussian filter) or the ε-filter is an example.

At the gradation filter step S06a, only the pixels of the original image 6 which have the skin color strength value larger than 0 in the skin color area image 10a are gradated. As a result, the pixels 0 in the color strength value, i.e. the pixels which apparently represent no skin color or the pixels masked by the synthesis step S04a are not gradated. The execution of the gradation filter step S06a generates a gradated image 11.

<<Skin Beautifying Synthesis Process>>

Next, in the skin beautifying process, the data of the original image 6, the data of the skin color area image 10a and the data of the gradated image 11 are input and the skin beautifying synthesis step S07 is executed. In the skin beautifying synthesis step S07, the original image 6 and the gradated image 11 are synthesized translucently using the skin color strength of the skin color area image 10a. Expression 3 represents equations for the translucent synthesis executed at the skin beautifying synthesis step S07.

$$R = R_{org} \times (1-V) + R_{smooth} \times V$$

$$G = G_{org} \times (1-V) + G_{smooth} \times V$$

$$B = B_{org} \times (1-V) + B_{smooth} \times V \quad \text{[Expression 3]}$$

where $R_{org}$, $G_{org}$, $B_{org}$ are RGB components of the original image, $R_{smooth}$, $G_{smooth}$, $B_{smooth}$ the RGB components of the gradated image, and V the skin color strength (0 to 1) of the skin color area image.

In the translucent synthesis using Expression 3, the synthesis process is executed in accordance with the skin color strength. Specifically, the pixels having a high skin color strength strongly reflect the pixel value (RGB components) of the gradated image 11, while the pixels having a low skin color strength strongly reflect the pixel value (RGB components) of the original image 6. By this translucent synthesis, the gradation degree is strengthened for the area having a high skin color strength (i.e. the skin color area) while at the same time weakening the gradation degree for the area having a low skin color strength (i.e. the area other than the skin color area). The execution of the skin beautifying synthesis step S07 generates the skin beautification image 12.

[Operation/Effects]

In the image correction unit 1a according to this invention, the face of an object is detected from the image to be processed and the face rectangle coordinate obtained at the face position detection step S01. Based on the face rectangle coordinate, the mask image 7 is generated to mask other than the upper half portion of the object. In the skin beautifying process, the gradation process reflecting the mask process using the mask image 7 is executed. As a result, during the execution of the gradation process in the area having the skin color component such as the face of the object, the gradation process is not executed for the area (such as the background) other than the object having the skin color component in the same image. While the gradation process is being executed on the face of the object, etc., therefore, the background, etc. having the skin color component is prevented from being blurred and can be maintained in a clear state. Specifically, only the face of the object or thereabouts are smoothed by removing wrinkles and spots.

Also, in the image correction unit 1a according to this invention, the skin color component of the object is extracted from inside the sampling area 18, i.e. from inside the face area of the object detected by the face position detection step S01. Based on the skin color component thus extracted, the area to be gradated is determined. Specifically, based on the skin color component extracted, the skin color component recognized as a skin color at the time of generating the skin color strength image 8 is determined. In the case where the object is a person having a white skin, therefore, the skin color strength image 8 is generated based on the extracted white skin color component, while in the case where the object is a person having a black skin, on the other hand, the skin color strength image 8 is generated based on the extracted black skin color component. In this way, in the image correction unit 1a according to this invention, the skin color is not determined fixedly, but sampled from the face position in the original image 6. Therefore, it is possible to handle the difference in skin color between different races or individuals, thereby producing a stable correction effect.

Also, at the mask image generation step S02, the gradation of non-transmissibility is applied between the outer ellipse and the inner ellipse. In the boundary between the transmissible area not masked and the non-transmissible area masked, therefore, an unnatural image is prevented from being generated.

By the way, the image correction unit 1a according to this invention may be mounted on any of the various existing devices such as a printer, a display, a digital camera or a MPEG (moving picture experts group) player. In such a case, the image data input to the devices are input to the storage St as the data of the original image 6. The data of the skin beautification image 12 output from the image correction unit 1a is used in accordance with the characteristics of each device. In the case where the image correction unit 1a is mounted on the printer, for example, the skin beautification image 12 is printed on the printer.

Also, the image correction unit 1a according to this invention can be virtually implemented on the information processing system having a CPU by executing the steps S01 to S07 in FIG. 2. In this case, the program for causing the information processing system to execute the steps S01 to S07 constitutes this invention. This program is recorded in a recording medium such as a CD-ROM and may be executed directly by a personal computer or a server (the server installed on an ASP (application service provider), for example), or stored in and executed by a nonvolatile storage unit such as a hard disk drive or a ROM. In this case, the data of the original image 6 may be input from a scanner or a digital camera connected to the information processing system. Also, the data of the original image 6 may be input by uploading or downloading from other devices through a network such as the internet.

[Modifications]

The face detector 2, the mask processor 3, the skin color area extractor 4a and the skin beautifying processor 5a each may be configured of a chip mounted as hardware. Also, the storage St may be configured of a RAM of another device on which the image correction unit 1a is mounted. Specifically, the storage St is not necessarily arranged in the image correction unit 1a, but outside of the image correction unit 1a as far as it is accessible from the face detector 2, the mask processor 3, the skin color area extractor 4a and the skin beautifying processor 5a. In this case, the storage St may be configured to be shared by other devices (such as the CPU of a device on which the image correction unit 1a is mounted) and each of the processors 2 to 5 of the image correction unit 1a.

Also, at the gradation filter step S06a, the gradation degree can be determined based on the size of the face rectangle detected by the face position detection step S01. Specifically, the larger the face rectangle, the stronger (larger) the gradation degree with which the gradation process is executed. On the contrary, the smaller the face rectangle, the weaker (smaller) the gradation degree with which the gradation process is executed. This can be realized, for example, by manipulating the parameters such as the radius of the moving average filter or the load average filter. In the case of the Gaussian filter, on the other hand, the gradation degree can be changed by changing the standard deviation σ in the equation below.

$$G(x, y) = \frac{1}{2\pi\sigma^2} \exp\left(-\frac{x^2 + y^2}{2\sigma^2}\right) \qquad \text{[Expression 4]}$$

Figures 8A, 8B, 8C:
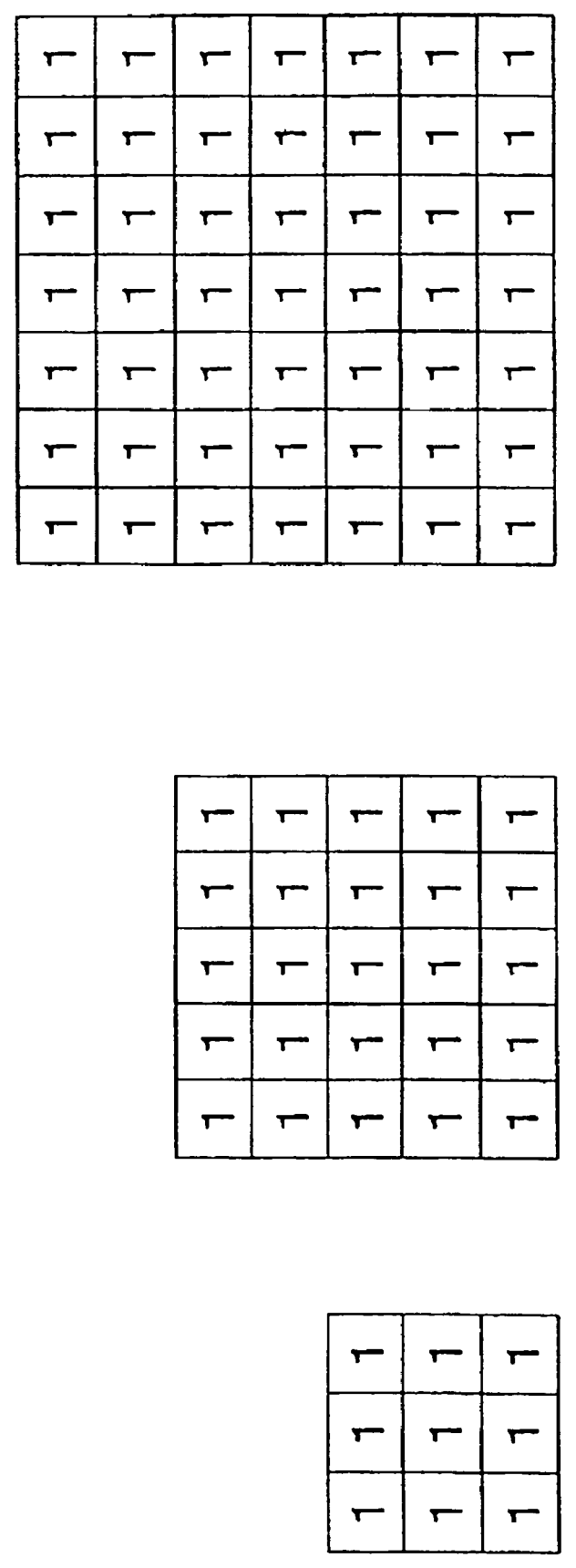

In the case of a simple smoothing filter, the gradation degree can be changed by changing the value n in the n×n operator. FIG. 8 is a diagram showing a specific example of the n×n operator. FIG. 8(a) shows an example of the operator in a case where n=3, FIG. 8(b) a case where n=5, and FIG. 8(c) a case where n=7. The larger the value n, the larger the gradation degree.

This configuration makes possible the execution of the gradation process with the gradation degree suitable for the face size. It is thus possible to obviate the problem of the blurring of the whole face which otherwise might be caused by executing the gradation process with an excessively large gradation degree for a small face.

Also, in the skin beautifying process, the image processing (examples: edge contrast, brightness correction, color correction, texture mapping) other than the gradation process as well as the gradation process may be executed.

Further, the mask processor 3 is not necessarily provided. In the absence of the mask processor 3, however, the process based on the mask image 7 is not executed. As a result, the time required before acquiring the skin beautification image 12 may be lengthened.

Second Embodiment

[System Configuration]

Figure 9:
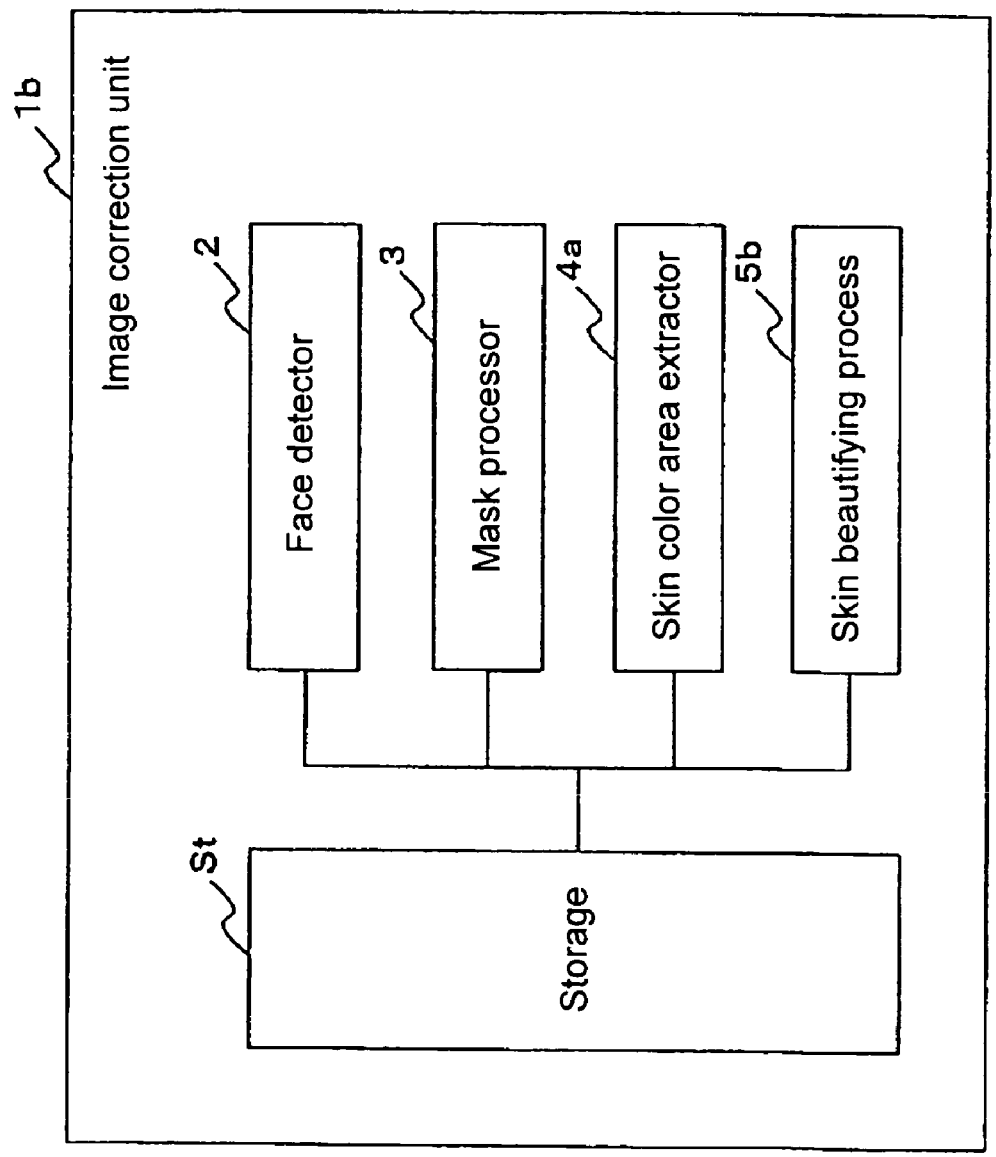
FIG. 9 is a diagram showing the function blocks of the image correction unit according to a second embodiment.

Next, an image correction unit 1b according to a second embodiment is explained. FIG. 9 is a diagram showing the function blocks of the image correction unit 1b. The image correction unit 1b is different from the image correction unit 1a in the provision of a skin beautifying processor 5b in place of the skin beautifying processor 5a. The points of the image correction unit 1b different from the image correction unit 1a are explained below.

Figure 10:
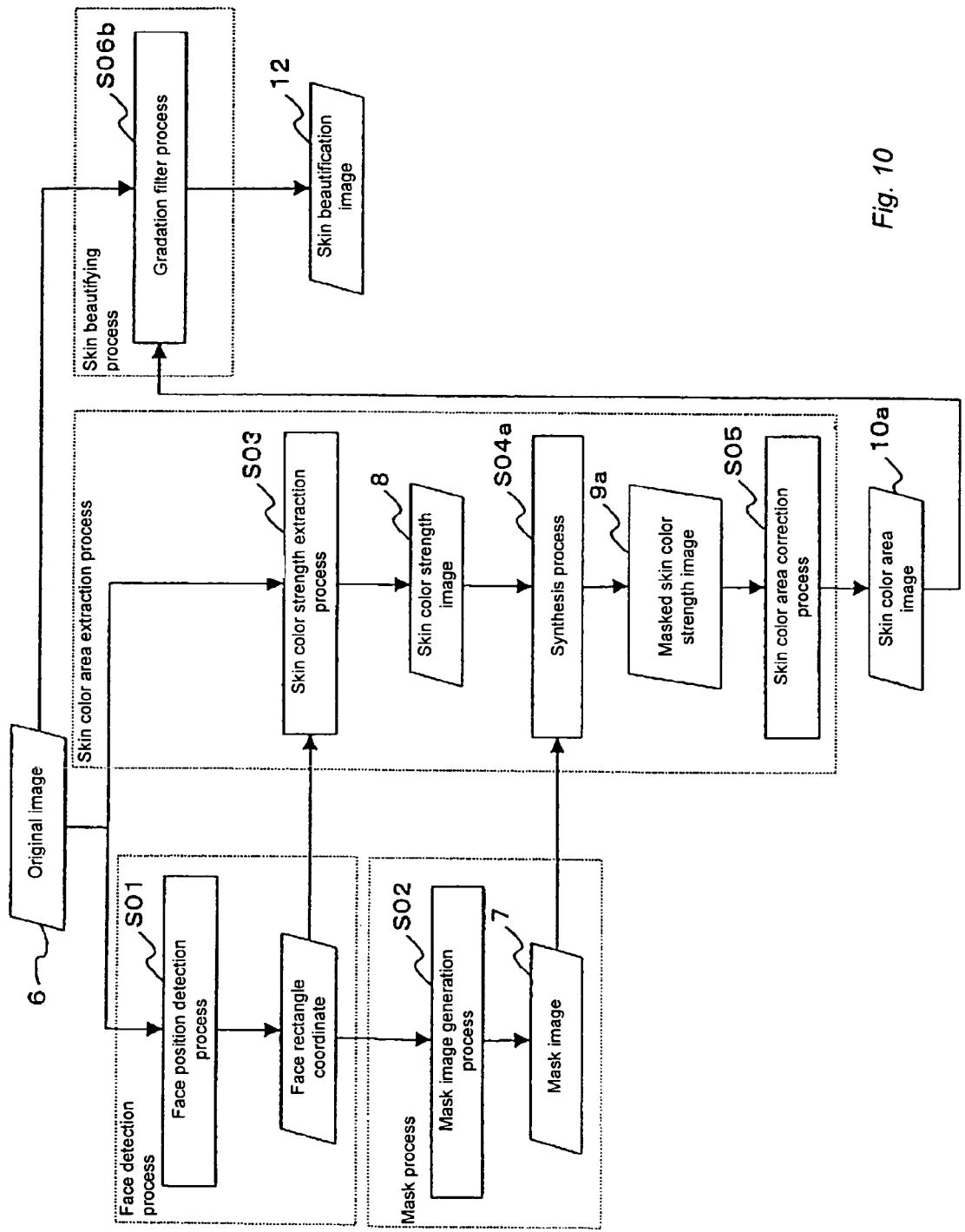
FIG. 10 is a diagram showing the processing flow of the image correction unit according to the second embodiment.

FIG. 10 is a diagram showing the process executed by each functional unit shown in FIG. 9 and the overall processing flow of the image correction unit 1b. With reference to FIGS. 9 and 10, each functional unit of the image correction unit 1b is explained below.

<Skin Beautifying Processor>

The skin beautifying processor 5b is different from the skin beautifying processor 5a in that the skin beautifying synthesis step S07 is not executed and the gradation filter step S06b is executed in place of the gradation filter step S06a. The skin beautifying process executed by the skin beautifying processor 5b is explained below.

<<Gradation Filter Process>>

In the skin beautifying process executed by the skin beautifying processor 5b, the data of the original image 6 and the data of the skin color area image 10a are input and the gradation filter step S06b is executed. At the gradation filter step S06b, each pixel of the original image 6 is subjected to the gradation process corresponding to the skin color strength included in the skin color area image 10a. Specifically, the gradation process for the pixels having a high skin color strength is set to a large gradation degree, and the gradation process for the pixels having a low skin color strength to a low gradation degree. Also, the gradation filter step 06b may be configured in the manner described below.

In the image correction unit 1a, the gradated image 11 is generated by the gradation filter step S06a, and the skin beautification image 12 is generated by the skin beautifying synthesis step S07 using the gradated image 11, the original image 6 and the skin color area image 10a. In the skin beautifying correction unit 1b, on the other hand, the gradated image 11 may not be generated but the skin beautification image 12. Specifically, each time the value of each pixel of the skin beautification image 12 is calculated based on the equation of Expression 3, the gradation process is executed for the pixels to be processed. Specifically, each value of the RGB components of the gradated image used in Expression 3 is calculated each time only for the required pixels. This configuration eliminates the need of buffering the gradated image 11 and can save the memory area.

[Operation/Effects]

In the image correction unit 1b according to this invention, the skin beautifying process is executed in such a manner that the skin beatification image 12 is generated directly as an output image without generating the gradated image 11. Therefore, the time required for the gradation filter step S06a to generate the gradated image 11 and the skin beautifying synthesis step S07 can be reduced.

Third Embodiment

[System Configuration]

Figure 11:
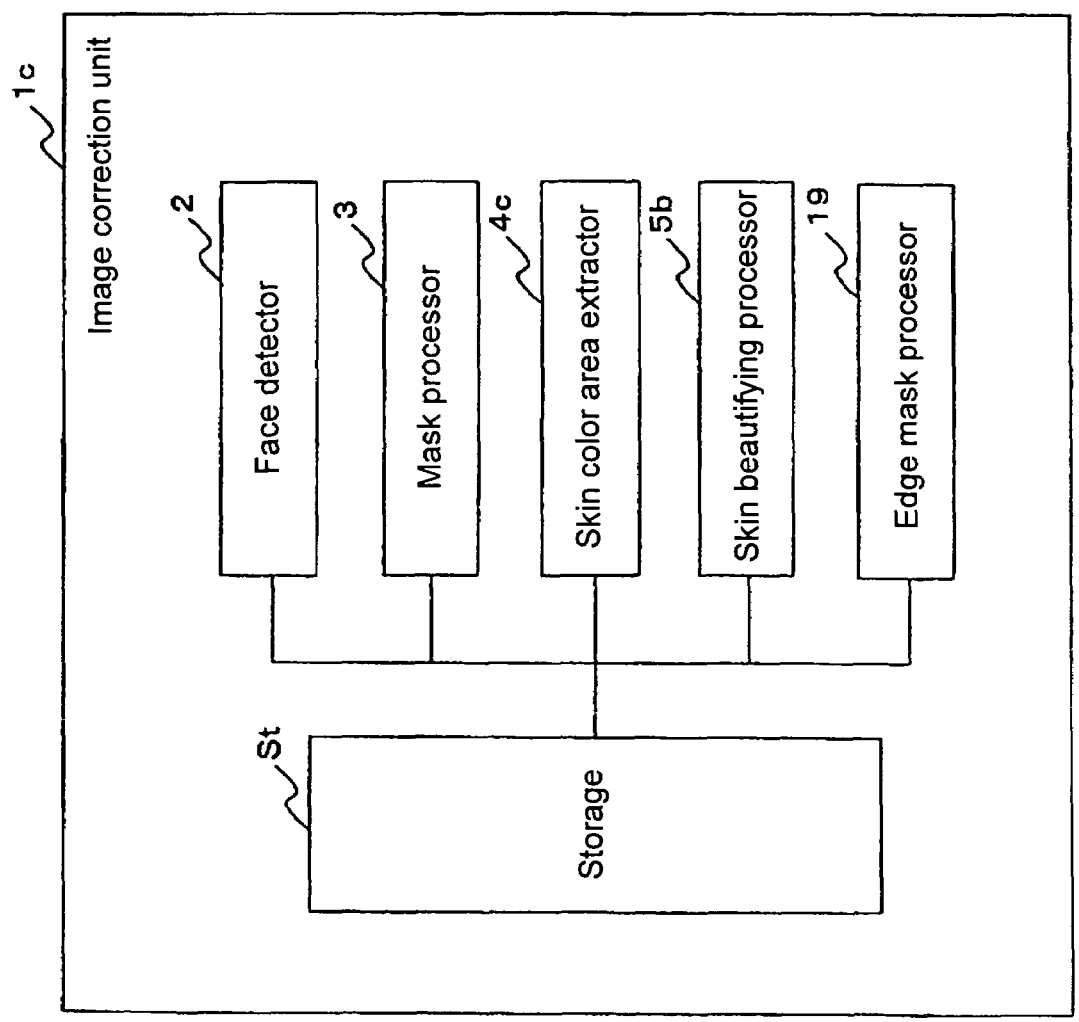
FIG. 11 is a diagram showing function blocks of the image correction unit according to a third embodiment.

Next, an image correction unit 1c according to a third embodiment is explained. FIG. 11 is a diagram showing the function blocks of the image correction unit 1c. The image correction unit 1c is different from the image correction unit 1b in the provision of the skin color area extractor 4c in place of the skin color area extractor 4a and the provision of the edge mask processor 19. The points of the image correction unit 1c different from the image correction unit 1b are described below.

Figure 12:
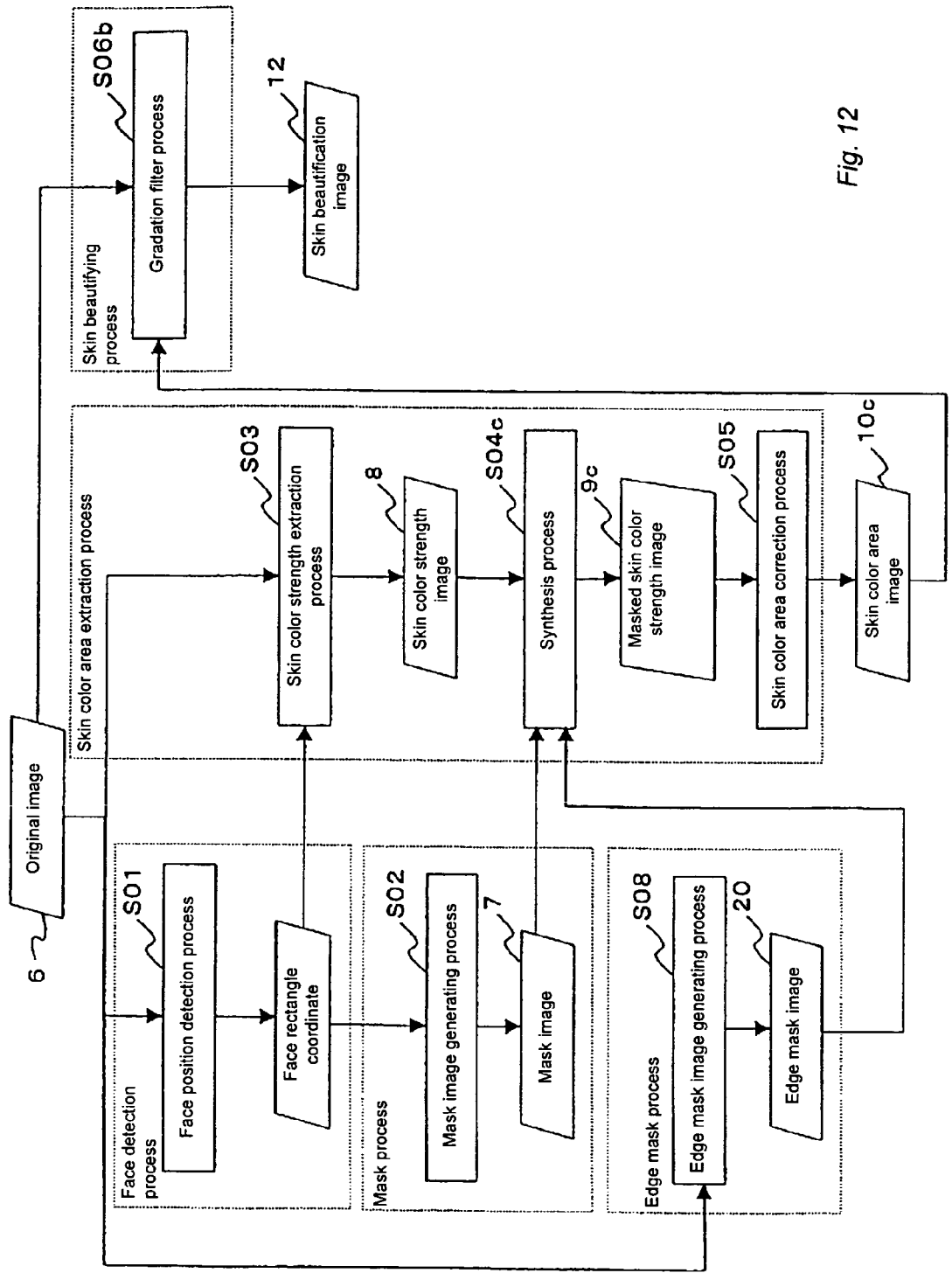
FIG. 12 is a diagram showing the processing flow of the image correction unit according to the third embodiment.

FIG. 12 is a diagram showing the process executed by the functional units shown in FIG. 11 and the overall processing flow of the image correction unit 1c. With reference to FIGS. 11 and 11, each functional unit of the image correction unit 1c is explained.

<Edge Mask Processor>

The edge mask processor 19 executes the edge mask process. The edge mask process is explained below. In the edge mask process, the original image 6 is input, and the edge mask image generating step S08 is executed to output the data of the edge mask image 20.

First, in the edge mask image generating step S08, the input original image 6 is reduced and a reduced image is acquired. By inputting the size of the face rectangle further, for example, the reduction ratio can be determined based on the size of the face rectangle. For example, the width of the largest one of the input face rectangles can be reduced to about a predefined number of pixels (about several tens to one hundred pixels).

Figures 13A, 13B:
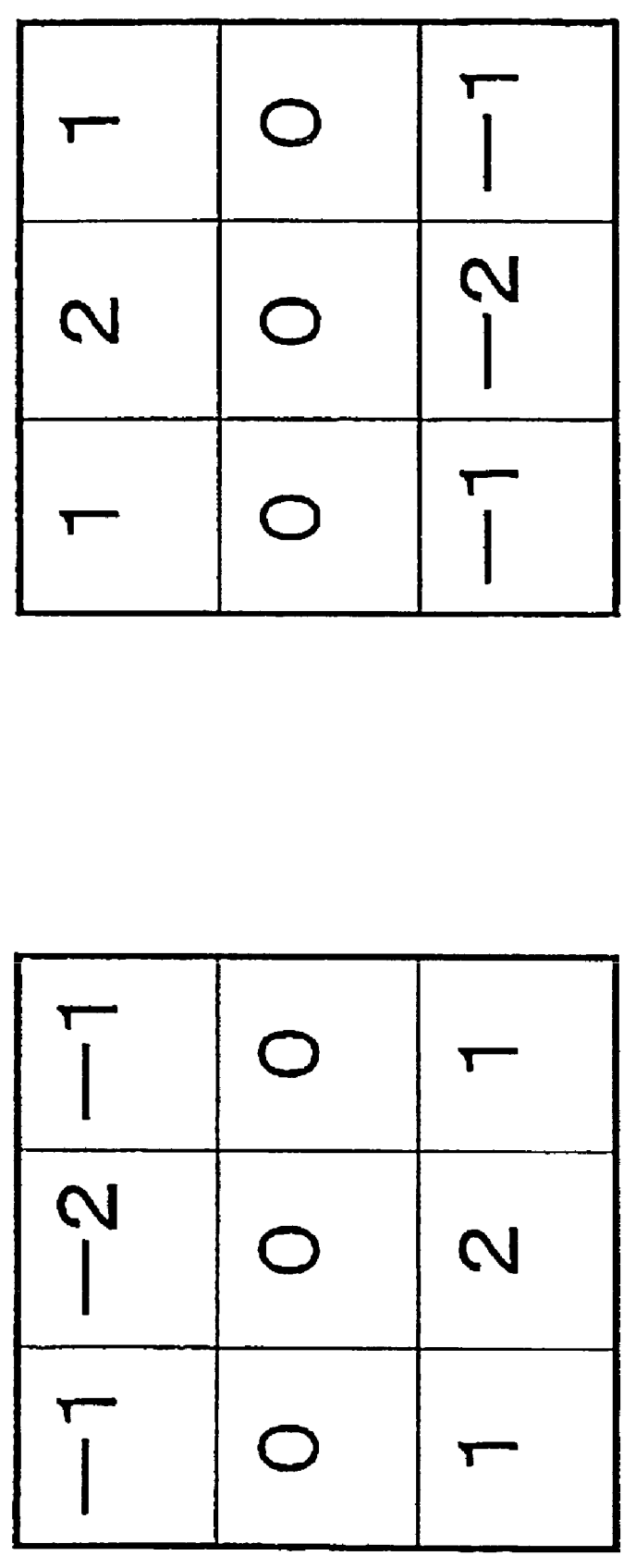

Next, the edges are extracted based on the reduced image, i.e. the edge strength is acquired. This edge extraction process can be executed by any existing technique. The edge extraction using the Sobel filter, for example, is carried out. FIG. 13 is a diagram showing an example of a Sobel filter. FIG. 13(a) shows a downward Sobel filter and FIG. 13(b) an upward Sobel filter. The edge extraction process using each Sobel filter is executed, and the edge image of each Sobel filter is acquired. In this case, two edge images are acquired.

Next, each acquired edge image is grayed and synthesized thereby to acquire a synthesized edge image. By this synthesis process, the edge extracted by the downward Sobel filter and the edge extracted by the upward Sobel filter are indicated in the synthesized edge image.

Next, the acquired synthesized edge image is inverted, and an inverted edge image is acquired. Next, the inverted edge image is subjected to the reduction process. By the execution of the reduction process, an image with the extracted edge expanded in the surrounding area is acquired. Then, the inverted edge image subjected to the reduction process is enlarged to the size of the original image 6 thereby to acquire the edge mask image 20. In the subsequent processes, the pixel value in the edge mask image 20 is handled as a skin color strength. Specifically, the pixels of the edge portion acquired have a low or zero pixel value due to the inversion and therefore are handled as pixels having a low skin color strength. Also, due to the reduction process, the effect of the extracted edge extends to the surrounding area. Specifically, the edge mask image 20 is generated as an image indicating the low skin color strength of the extracted edges and the surrounding area.

<Skin Color Area Extractor>

The skin color area extractor 4c is different from the skin color area extractor 4b in that the synthesis step S04c is executed in place of the synthesis step S04a. The skin color area extraction process executed by the skin color area extractor 4c is explained below with reference to the synthesis step S04c in particular.

<<Synthesis Process>>

In the skin color area extraction process executed by the skin color area extractor 4c, the skin color strength extraction step S03 is executed, after which the skin color strength image 8, the mask image 7 and the edge mask image 20 are input and the synthesis step S04c is executed.

At the synthesis step S04c, the input skin color strength image 8, the mask image 7 and the edge mask image 20 are synthesized. Specifically, the multiplication process is executed using the skin color strength image 8 generated by the skin color strength extraction step S03, the mask image 7 generated by the mask process and the edge mask image 20 generated by the edge mask process. By the execution of the synthesis step S04c, the masked skin color strength image 9c is generated.

In the skin color area extraction process executed by the skin color area extractor 4c, the synthesis step S04c is executed, after which the skin color area correction step S05 is executed using the masked skin color strength image 9c, and the skin color area image 10c is output.

[Operation/Effects]

The image correction unit 1c uses the edge mask image 20 at the synthesis step S04c. In the edge mask image 20, the skin color strength is set to a low value or zero for the extracted edge and the surrounding area. As a result, the synthesis step S04c can acquire the masked skin color strength image 9c with the skin color strength set low or to zero for the edge and the surrounding area. The skin beautifying process is executed using this masked skin color strength image 9c, and therefore while maintaining the freshness of the edge and the surrounding areas, i.e. the eyes, eyebrows, mouth, etc., the gradation process can be executed for the other skin color portions. Especially, the skin beautifying process can be effectively executed for the face image having the lipstick or the eyebrows (such as thin eyebrows) of substantially the skin color.

Figure 14:
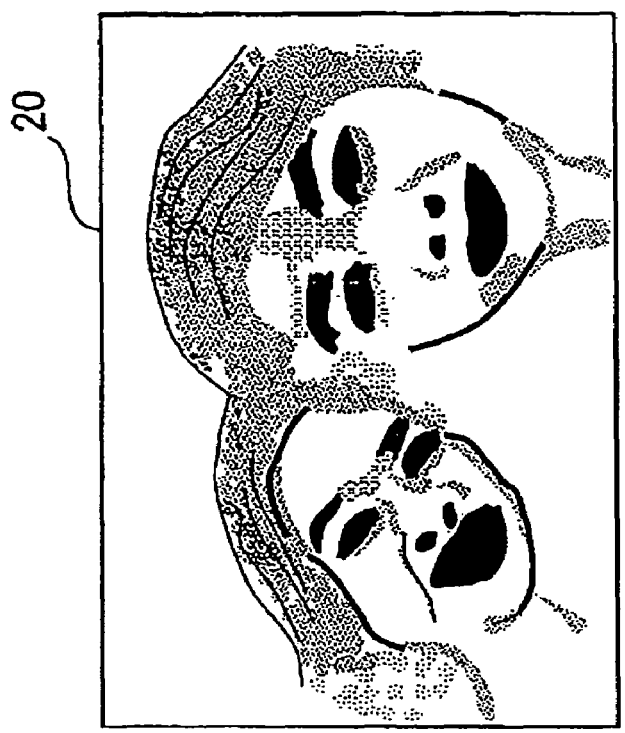
FIG. 14 is a diagram showing an example of the difference between the skin color strength image and the edge mask image.
Figure 14:
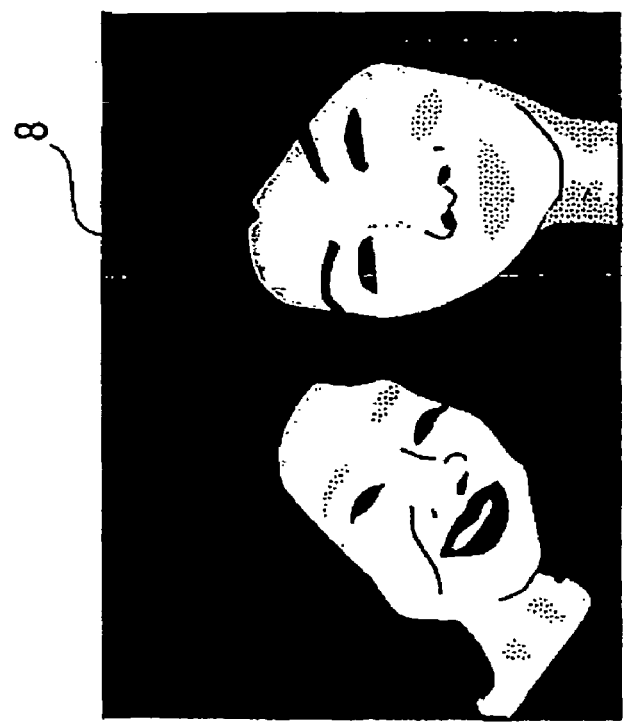

FIG. 14 is a diagram showing the difference between the skin color strength image 8 and the edge mask image 20. FIG. 14(*a*) shows an example of the skin color strength image 8, and FIG. 14(*b*) an example of the edge mask image 20. In this case, the color of the eyebrows of the left person in the original image 6 is near the skin color, and therefore, in the skin color strength image 8, the skin color strength of the eyebrows assumes a value near the skin color. Also, the color of the lips of the right person in the original image 6 is near the skin color, and therefore in the skin color strength image 8, the skin color strength of the lips assumes a value near the skin color. In this situation, even the eyebrows of the left person and the lips of the right person would be gradated so that a skin beautification image 12 with blurred eyebrows and lips would be obtained. In the edge mask image 20, on the other hand, the edges of the eyebrows of the left person and the lips of the right person are extracted, and therefore the skin color strength of the eyebrows of the left person and the lips of the right person assume a value far from the skin color. The use of the edge mask image 20 can thus maintain the freshness of the eyebrows and the lips which are not gradated.

[Modifications]

In the edge mask image generation step S08, the enlarging process, the inversion process and the reduction process may be changed in the order of execution as required. In the case where the reduction process is executed before the inversion process, however, the area of a low or zero pixel value (skin color strength) is not expanded outward, but the area high in pixel value (skin color strength) or 255 ("1" for the skin color strength) is expanded outward.

Instead of the edge mask processor 19 and the edge mask image generating step S08, the face element mask processor (corresponding to the face element extraction means) and the face element mask image generating process may be executed to generate a face element mask image in place of the edge mask image 20. In the face element mask image generating process, the edge is not extracted, but the elements (face elements) included in the face of the object. These face elements are extracted, for example, by template matching. In the face element mask image, the skin color strength of the extracted face elements or the pixels within a predetermined range from these face elements are set low or to zero.

The invention claimed is:

1. An image processing apparatus comprising:
   a computer storage for storing an image;
   a target area specifying means for specifying a target area determined based on a body portion of a person constituting an object in the image; and
   an image generating means for generating an image subjected to a gradation process as an image processing on a target area specified by the target area specifying means,
   wherein the target area specifying means includes:
      a detection means for detecting the body portion of a person constituting an object in an image; and
      a specifying means for specifying the target area based on the body portion detected by the detection means,
   wherein the image generating means generates an image subjected to the image processing in an area within a target area specified by the target area specifying means, which area has a color component equal or near to the main color component representing the body portion constituting a reference of the target area, and
   wherein the image generating means includes:
      a strength value calculation means for calculating a strength value indicating the degree to which the color component of each pixel of the image to be processed is near to the main color component representing the body portion constituting a reference of the target area.

2. An image processing apparatus according to claim 1, wherein the image generating means further includes:
   an image processing means for conducting the image processing on the target area of the image to be processed; and
   a color component calculation means for calculating a color component nearer to a color component of each pixel of the original image as a new color component of the pixel, the farther the strength value of the pixel from the main color component of the body portion providing a reference of the target area on the one hand, and calculating a color component nearer to the color component of each pixel of the image generated by the image processing means as a new color component of the pixel, the nearer the strength value of the pixel to the main color component of the body portion providing a reference of the target area on the other hand;
   wherein the color component calculation means calculates the new color component of each pixel based on the strength value calculated by the strength value calculation means.

3. An image processing apparatus according to claim 1, wherein the image generating means includes:
   an image processing means for conducting the image processing on the image to be processed;
   a mask means for changing the strength value of the pixels in other than the target area specified by the target area specifying means, to a value far from the main color component of the body portion constituting a reference of the target area; and
   a color component calculation means for calculating a color component nearer to the color component of each pixel of the original image as a new color component of the pixel, the farther the strength value of the pixel from the main color component of the body portion providing a reference of the target area on the one hand, and calculating a color component nearer to the color component of each pixel of the image generated by the image processing means as a new color component of the pixel, the nearer the strength value of the pixel to the main color component of the body portion providing a reference of the target area on the other hand;
   wherein the color component calculation means calculates a new color component of each pixel based on the strength value calculated by the strength value calculation means and the mask means.

4. An image processing apparatus according to claim 1, wherein the image generating means includes:
   an image processing means for conducting the image processing on each pixel of the target area of the image to be processed, by weakening the effect of the image processing more, the farther the strength value of the pixel from the main color component of the body portion constituting a reference of the target area on the one hand, and by strengthening the effect of the image processing more, the nearer the strength value of the pixel from the main color component of the body portion constituting a reference of the target area on the other hand;

wherein the image processing means conducts the image processing based on the strength value of each pixel of the image obtained by the strength value calculation means.

5. An image processing apparatus according to claim 1, wherein the image generating means includes:

a mask means for changing the strength value of the pixels in other than the target area specified by the target area specifying means, to a value far from the main color component of the body portion constituting a reference of the target area; and an image processing means for conducting the image processing on the image to be processed, by weakening the effect of the image processing more, the farther the strength value of the pixel from the main color component of the body portion constituting a reference of the target area on the one hand, and by strengthening the effect of the image processing more, the nearer the strength value of the pixel from the main color component of the body portion constituting a reference of the target area on the other hand;

wherein the image processing means conducts the image processing based on the strength value of each pixel of the image obtained by the strength value calculation means and the mask means.

6. An image processing apparatus as set forth in claim 3, wherein the image processing means conducts no image processing of a pixel having a predetermined range of the strength value.

7. An image processing apparatus according to claim 1, wherein the image generating means determines the contents of the image processing to be conducted, based on the size of the body portion constituting a reference of the target area specified by the target area specifying means.

8. An image processing apparatus according to claim 1, further comprising an element extraction means for extracting at least one element making up the body portion of a person constituting an object in an image to be processed, and included in the target area, wherein the image generating means conducts, in a limited way, the image processing of an element area determined based on the element extracted by the element extraction means.

9. An image processing apparatus as set forth in claim 2, wherein the image generating means further includes an edge mask means for acquiring the strength of the edge of each pixel of an image to be processed, and producing the strength value of the pixel which is farther from the main color component of the body portion constituting a reference of the target area, the higher the strength of the edge extracted, wherein the color component calculation means calculates a new color component of each pixel based on the strength value calculated by the edge mask means.

10. An image processing apparatus as set forth in claim 4, wherein the image generating means further includes an edge mask means for acquiring the strength of the edge of each pixel of an image to be processed, and producing the strength value of the pixel which is farther from the main color component of the body portion constituting a reference of the target area, the higher the strength of the edge extracted; and wherein the image processing means conducts the image processing further based on the strength value of each pixel of the image obtained by the edge mask means.

11. An image processing apparatus as set forth in claim 9, wherein the edge mask means produces the strength value for each pixel after reducing the image to be processed, and further enlarges the image to the original size.

12. A computer readable medium storing a program for causing an information processing system to execute:

a step of specifying a target area determined based on a body portion of a person constituting an object in an image; and a step of generating an image subjected to a gradation process for the target area specified, wherein the step of generating an image comprises calculating a strength value indicating the degree to which a color component of each pixel of the image to be processed is near to a main color component representing the body portion constituting a reference of the target area.

13. A computer readable medium storing a program according to claim 12, wherein the image generating step causes the information processing system to generate an image subjected to the image processing based on a skin color component of a person constituting an object, extracted from the body portion providing a reference of the target area specified.

14. A computer readable medium storing a program for causing an information processing system to execute:

a step of specifying a position and a range of an area including an arbitrary image in an image; and a step of generating an image subjected to an image processing in an area having a color component equal or near to a main color component representing an area in the specified area, wherein the step of generating an image comprises calculating a strength value indicating the degree to which a color component of each pixel of the image to be processed is near to a main color component representing the body portion constituting a reference of the target area.

15. An image processing apparatus according to claim 10, wherein the edge mask means produces the strength value for each pixel after reducing the image to be processed, and further enlarges the image to the original size.

* * * * *